US012615420B2

(12) United States Patent
Liu et al.

(10) Patent No.: US 12,615,420 B2
(45) Date of Patent: Apr. 28, 2026

(54) SYNCHRONIZATION METHOD AND APPARATUS OF PLAYING INFORMATION, TERMINAL DEVICE, AND STORAGE MEDIUM

(71) Applicant: Beijing Zitiao Network Technology Co., Ltd., Beijing (CN)

(72) Inventors: Tianhao Liu, Beijing (CN); Hongquan Zhu, Beijing (CN); Yingjia Qiu, Beijing (CN); Bingnan Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/847,616

(22) PCT Filed: Mar. 14, 2023

(86) PCT No.: PCT/CN2023/081205
§ 371 (c)(1),
(2) Date: Sep. 16, 2024

(87) PCT Pub. No.: WO2023/179406
PCT Pub. Date: Sep. 28, 2023

(65) Prior Publication Data
US 2025/0211828 A1 Jun. 26, 2025

(30) Foreign Application Priority Data
Mar. 22, 2022 (CN) .......................... 202210287004.7

(51) Int. Cl.
*H04N 21/482* (2011.01)
*H04N 21/43* (2011.01)
(52) U.S. Cl.
CPC ..... *H04N 21/4825* (2013.01); *H04N 21/4307* (2013.01)

(58) Field of Classification Search
CPC ....................... H04N 21/4307; H04N 21/4825
See application file for complete search history.

(56) References Cited

U.S. PATENT DOCUMENTS

| | | | |
|---|---|---|---|
| 7,344,084 B2 * | 3/2008 | DaCosta ............ | H04N 21/4126 348/E7.071 |
| 7,349,359 B2 * | 3/2008 | Chang .................... | H04L 12/66 370/312 |

(Continued)

FOREIGN PATENT DOCUMENTS

| | | |
|---|---|---|
| CN | 102947827 A | 2/2013 |
| CN | 104580411 A | 4/2015 |

(Continued)

OTHER PUBLICATIONS

Liu, J., "Design and Implementation of Karaoke and KTV Room System in Live Broadcast and Audio-Video Instant Communication Scenarios," China Excellent Master's Thesis Full Text Database Information Technology Collection (Monthly), Issue 03, Mar. 15, 2022, 102 pages.

(Continued)

*Primary Examiner* — Michael B. Pierorazio
(74) *Attorney, Agent, or Firm* — Alleman Hall LLP

(57) ABSTRACT

A synchronization method and apparatus of playing information, a terminal device, and a storage medium are provided. The method includes: in response to obtaining a playing synchronization message sent by any one second client of at least one second client in a playing group, updating current playing information according to the playing synchronization message; and displaying target playing information in response to obtaining a user operation instruction, and sending the target playing information to the at least one second client in the playing group through the playing synchronization message, so that the at least one (Continued)

In response to obtaining a playing synchronization message sent by any one of one or more second clients in a playing group, updating current playing information according to the playing synchronization message ~ S110

Displaying matched target playing information in response to obtaining a user operation instruction, and sending the target playing information to the one or more second clients in the playing group through the playing synchronization message, so that the one or more second clients updates respective playing information according to the target playing information ~ S120 second client updates respective playing information according to the target playing information.

18 Claims, 6 Drawing Sheets

(56) References Cited

U.S. PATENT DOCUMENTS

| | | | | |
|---|---|---|---|---|
| 7,406,703 | B2 * | 7/2008 | Lee | H04N 21/2362 |
| | | | | 725/135 |
| 7,457,542 | B2 * | 11/2008 | Sekine | H04B 10/2507 |
| | | | | 398/208 |
| 7,707,303 | B2 * | 4/2010 | Albers | H04L 47/263 |
| | | | | 709/231 |
| 7,712,125 | B2 * | 5/2010 | Herigstad | H04N 21/4755 |
| | | | | 725/38 |
| 7,796,551 | B1 * | 9/2010 | Machiraju | H04L 5/003 |
| | | | | 370/348 |
| 7,818,779 | B2 * | 10/2010 | Matsuzaki | H04N 21/2347 |
| | | | | 725/147 |
| 8,089,911 | B2 * | 1/2012 | Huang | H04L 5/14 |
| | | | | 370/335 |
| 8,305,980 | B1 * | 11/2012 | Nix | H04L 1/0009 |
| | | | | 370/329 |
| 8,356,325 | B2 * | 1/2013 | Foti | H04L 65/1083 |
| | | | | 725/95 |
| 8,412,798 | B1 * | 4/2013 | Wang | H04L 67/52 |
| | | | | 709/217 |
| 11,944,917 | B2 * | 4/2024 | Andersson | H04N 21/42202 |
| 2003/0135632 | A1 * | 7/2003 | Vrzic | H04W 28/02 |
| | | | | 709/231 |
| 2004/0025184 | A1 * | 2/2004 | Hakenberg | H04N 21/6375 |
| | | | | 375/E7.017 |
| 2004/0226050 | A1 * | 11/2004 | Matsuzaki | H04N 21/8547 |
| | | | | 725/135 |
| 2005/0058090 | A1 * | 3/2005 | Chang | H04L 12/66 |
| | | | | 370/312 |
| 2005/0166135 | A1 * | 7/2005 | Burke | H04N 21/4302 |
| | | | | 370/503 |
| 2005/0216731 | A1 * | 9/2005 | Saito | H04N 21/25816 |
| | | | | 713/153 |
| 2006/0112168 | A1 * | 5/2006 | Albers | H04L 47/30 |
| | | | | 709/213 |
| 2006/0227796 | A1 * | 10/2006 | Wei | H04L 47/56 |
| | | | | 370/412 |
| 2006/0280502 | A1 * | 12/2006 | Sekine | H04L 12/66 |
| | | | | 398/71 |
| 2007/0067812 | A1 * | 3/2007 | Watanabe | H04N 21/26208 |
| | | | | 348/E7.071 |
| 2008/0134258 | A1 * | 6/2008 | Goose | H04N 21/632 |
| | | | | 725/91 |
| 2008/0198785 | A1 * | 8/2008 | Huang | H04N 21/6131 |
| | | | | 370/312 |
| 2009/0247211 | A1 * | 10/2009 | Kuroda | H04W 52/325 |
| | | | | 455/522 |
| 2010/0100917 | A1 * | 4/2010 | Chiao | H04N 21/43076 |
| | | | | 725/110 |
| 2010/0121941 | A1 * | 5/2010 | Harrang | G06F 16/24 |
| | | | | 709/219 |
| 2010/0138561 | A1 * | 6/2010 | Church | H04W 52/58 |
| | | | | 709/248 |
| 2010/0205642 | A1 * | 8/2010 | Foti | H04L 65/1083 |
| | | | | 725/109 |

| | | | | |
|---|---|---|---|---|
| 2010/0232453 | A1 * | 9/2010 | Ohashi | H04N 21/2402 |
| | | | | 370/468 |
| 2010/0303100 | A1 * | 12/2010 | Niamut | H04L 65/80 |
| | | | | 370/503 |
| 2011/0231553 | A1 * | 9/2011 | Patel | H04W 72/044 |
| | | | | 709/227 |
| 2012/0002111 | A1 * | 1/2012 | Sandoval | H04N 5/06 |
| | | | | 348/521 |
| 2012/0079541 | A1 * | 3/2012 | Pan | H04N 21/4302 |
| | | | | 725/62 |
| 2012/0093062 | A1 * | 4/2012 | Perras | H04W 80/04 |
| | | | | 370/315 |
| 2012/0120845 | A1 * | 5/2012 | Perras | H04W 8/186 |
| | | | | 370/254 |
| 2013/0251329 | A1 * | 9/2013 | McCoy | H04N 21/44004 |
| | | | | 386/E5.032 |
| 2014/0029910 | A1 * | 1/2014 | Maruyama | H04N 21/43074 |
| | | | | 386/220 |
| 2015/0301788 | A1 * | 10/2015 | Johnston | H04N 21/4112 |
| | | | | 700/94 |
| 2016/0234345 | A1 * | 8/2016 | Roberts, Jr. | H04L 67/306 |
| 2017/0090856 | A1 | 3/2017 | Lin | |
| 2018/0035164 | A1 * | 2/2018 | Sizemore | H04N 21/4263 |
| 2019/0313355 | A1 | 10/2019 | Alsina et al. | |
| 2020/0007621 | A1 | 1/2020 | Adams | |
| 2024/0040065 | A1 * | 2/2024 | Chou | H04N 5/05 |

FOREIGN PATENT DOCUMENTS

| | | |
|---|---|---|
| CN | 105096990 A | 11/2015 |
| CN | 105554522 A | 5/2016 |
| CN | 106790497 A | 5/2017 |
| CN | 107925783 A | 4/2018 |
| CN | 109218035 A | 1/2019 |
| CN | 109819302 A | 5/2019 |
| CN | 110300319 A | 10/2019 |
| CN | 112069353 A | 12/2020 |
| CN | 112954426 A | 6/2021 |
| CN | 113055728 A | 6/2021 |
| CN | 113204658 A | 8/2021 |
| CN | 114827698 A | 7/2022 |
| CN | 114827698 B | 2/2024 |
| WO | 2012137190 A1 | 10/2012 |
| WO | 2017016116 A1 | 2/2017 |

OTHER PUBLICATIONS

Moriyasu, S. et al., "Group Synchronization Method with Fast Response Time for VoD Services," Proceedings of "The International Conference on Information Network 2012", Feb. 1, 2012, Bali, Indonesia, 6 pages.

China National Intellectual Property Administration, Notice of Allowance issued in Chinese Application No. 202210287004.7, Jan. 9, 2024, 6 pages. (Submitted with partial English translation).

China National Intellectual Property Administration, Office action issued in Chinese Application No. 202210287004.7, Sep. 14, 2023, 12 pages. (Submitted with partial English translation).

ISA China National Intellectual Property Administration, International Search Report Issued in Application No. PCT/CN2023/ 081205, Jun. 19, 2023, 12 pages. (Submitted with partial English translation).

European Patent Office, Extended European Search Report Issued in Application No. 23773654.1, Oct. 21, 2025, Germany, 10 pages.

* cited by examiner

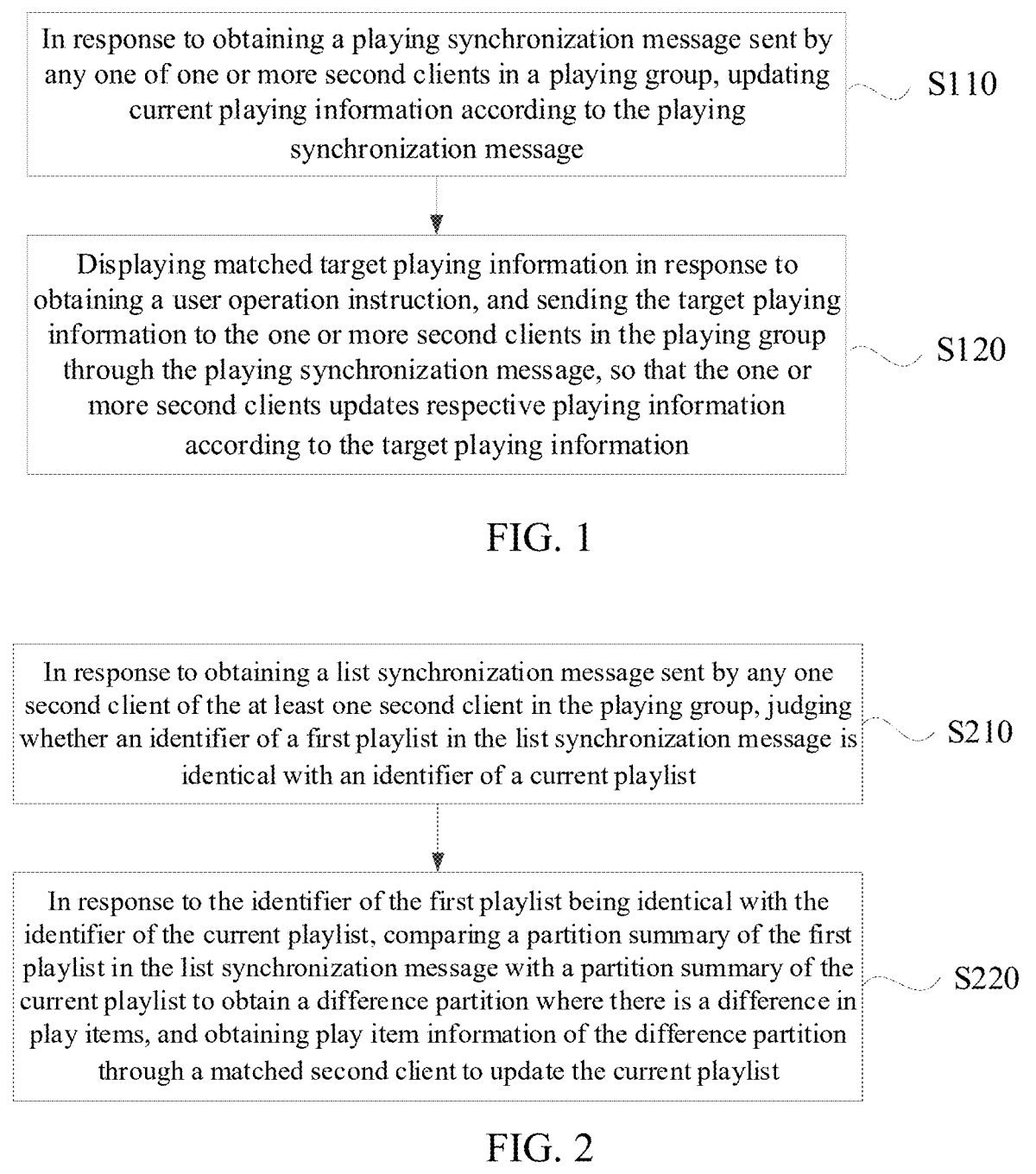

In response to obtaining a playing synchronization message sent by any one of one or more second clients in a playing group, updating current playing information according to the playing synchronization message ~~~ S110

Displaying matched target playing information in response to obtaining a user operation instruction, and sending the target playing information to the one or more second clients in the playing group through the playing synchronization message, so that the one or more second clients updates respective playing information according to the target playing information ~~~ S120

FIG. 1

In response to obtaining a list synchronization message sent by any one second client of the at least one second client in the playing group, judging whether an identifier of a first playlist in the list synchronization message is identical with an identifier of a current playlist ~~~ S210

In response to the identifier of the first playlist being identical with the identifier of the current playlist, comparing a partition summary of the first playlist in the list synchronization message with a partition summary of the current playlist to obtain a difference partition where there is a difference in play items, and obtaining play item information of the difference partition through a matched second client to update the current playlist ~~~ S220

FIG. 2

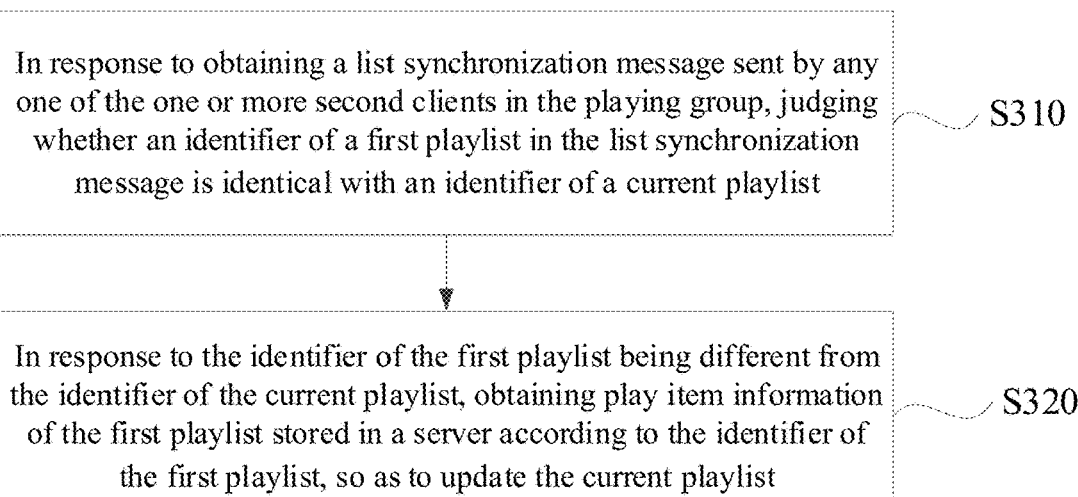

In response to obtaining a list synchronization message sent by any one of the one or more second clients in the playing group, judging whether an identifier of a first playlist in the list synchronization message is identical with an identifier of a current playlist — S310

In response to the identifier of the first playlist being different from the identifier of the current playlist, obtaining play item information of the first playlist stored in a server according to the identifier of the first playlist, so as to update the current playlist — S320

FIG. 3

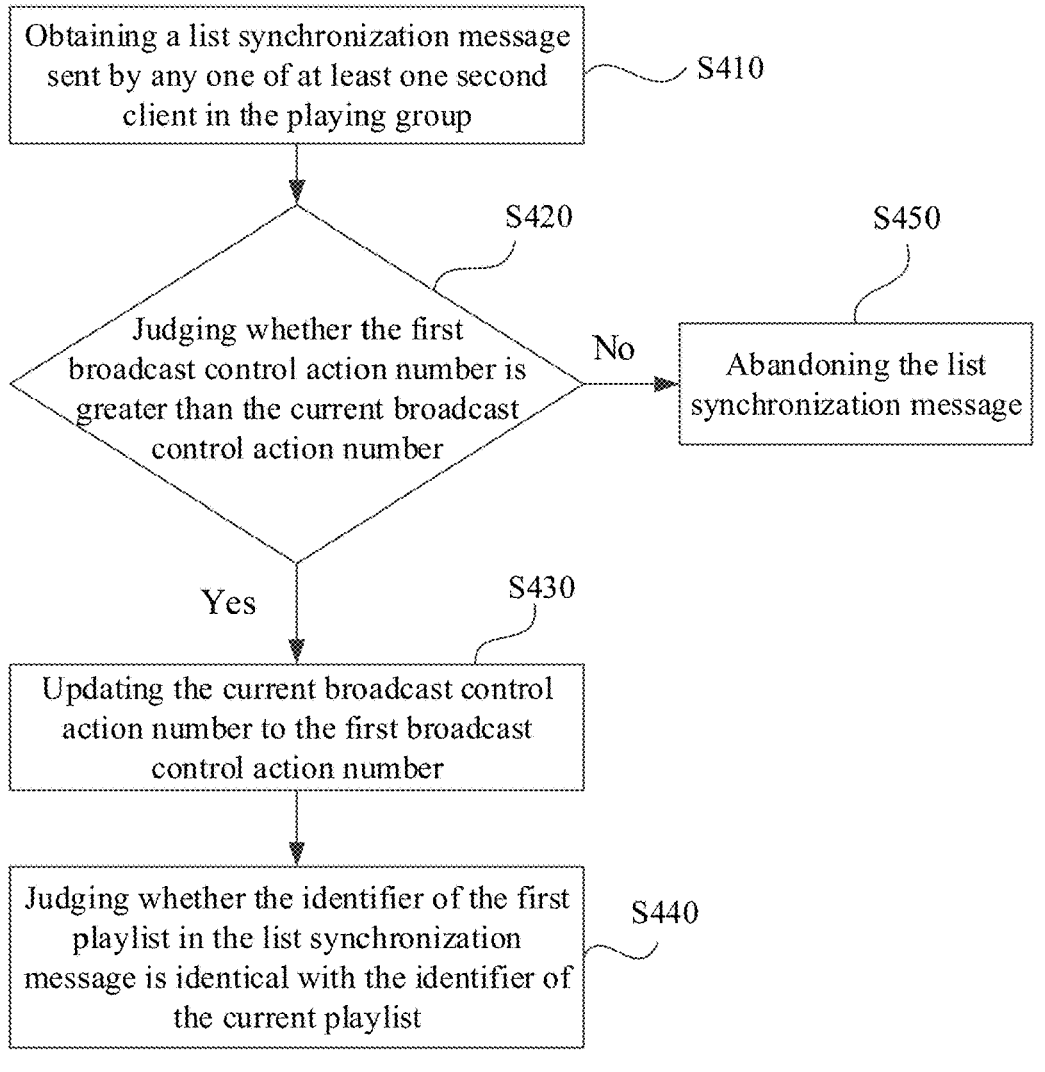

Obtaining a list synchronization message sent by any one of at least one second client in the playing group — S410

Judging whether the first broadcast control action number is greater than the current broadcast control action number — S420

No — Abandoning the list synchronization message — S450

Yes

Updating the current broadcast control action number to the first broadcast control action number — S430

Judging whether the identifier of the first playlist in the list synchronization message is identical with the identifier of the current playlist — S440

FIG. 4A

SYNCHRONIZATION METHOD AND APPARATUS OF PLAYING INFORMATION, TERMINAL DEVICE, AND STORAGE MEDIUM

CROSS-REFERENCE TO RELATED APPLICATIONS

The present disclosure is a U.S. national stage application of International Patent Application No. PCT/CN2023/081205, filed on Mar. 14, 2023, which claims the priority of Chinese Patent Application No. 202210287004.7, filed on Mar. 22, 2022. All the aforementioned patent applications are hereby incorporated by reference in their entireties.

TECHNICAL FIELD

Embodiments of the present disclosure relate to information sharing technology, such as to a synchronization method and apparatus of playing information, a terminal device, and a storage medium.

BACKGROUND

With the continuous development of network technology, experience sharing in pan-entertainment scenarios has become the focus of attention in the Internet field. By controlling the playing of audio and video information, each sharing participant can enjoy the audio and video information synchronously and experience shared broadcast control.

In related technologies, participants in sharing the audio and video information are divided into different identities. Take an online conference with video sharing as an example. Participants' identities include host, guest, and viewer. The host has video control permissions such as switching and pausing, and can interact with guests via voice. The guest can watch the video shared by the host and interact with the host, but does not have the video control permissions; the viewer can only watch the video shared by the host, but cannot interact with the host, and does not have the video control permissions.

However, in such sharing mode, each sharing participant does not have the same control permission in essence, and the shared broadcast control is not achieved, so that the participation of sharing participants is extremely low and the user experience is poor.

SUMMARY

The present disclosure provides a synchronization method and apparatus of playing information, a terminal device, and a storage medium, so as to achieve synchronous update of playing information of respective clients in a playing group.

In a first aspect, an embodiment of the present disclosure provides a synchronization method of playing information, which is applied to a first client and includes:

in response to obtaining a playing synchronization message sent by any one second client of at least one second client in a playing group, updating current playing information according to the playing synchronization message;

displaying matched target playing information in response to obtaining a user operation instruction, and sending the target playing information to the at least one second client in the playing group through the playing synchronization message, so that the at least one second client updates respective playing information according to the target playing information.

In a second aspect, an embodiment of the present disclosure provides a synchronization apparatus of playing information, which is applied to a first client and comprises:

a synchronization message obtaining module, configured to, in response to obtaining a playing synchronization message sent by any one second client of at least one second client in a playing group, update current playing information according to the playing synchronization message;

a playing information update module, configured to display matched target playing information in response to obtaining a user operation instruction, and send the target playing information to the at least one second client in the playing group through the playing synchronization message, so that the at least one second client updates respective playing information according to the target playing information.

In a third aspect, an embodiment of the present disclosure provides a terminal device, which includes a memory, a processing apparatus, and a computer program stored on the memory and executable on the processing apparatus, and the processing apparatus implements the synchronization method of playing information in any embodiment of the present disclosure when executing the program.

In a fourth aspect, an embodiment of the present disclosure provides a storage medium comprising computer-executable instructions, and the computer-executable instructions, when executed by a computer processor, are used to perform the synchronization method of playing information of any embodiment of the present disclosure.

BRIEF DESCRIPTION OF DRAWINGS

Throughout the accompanying drawings, the same or similar reference numerals indicate the same or similar elements. It should be understood that the accompanying drawings are schematic and that components and elements are not necessarily drawn to scale.

FIG. 1 is a flowchart of one embodiment of a synchronization method of playing information of the present disclosure;

FIG. 2 is a flowchart of another embodiment of a synchronization method of playing information of the present disclosure;

FIG. 3 is a flowchart of still another embodiment of a synchronization method of playing information of the present disclosure;

FIG. 4A is a flowchart of yet another embodiment of a synchronization method of playing information of the present disclosure;

DETAILED DESCRIPTION

Figure 4B:
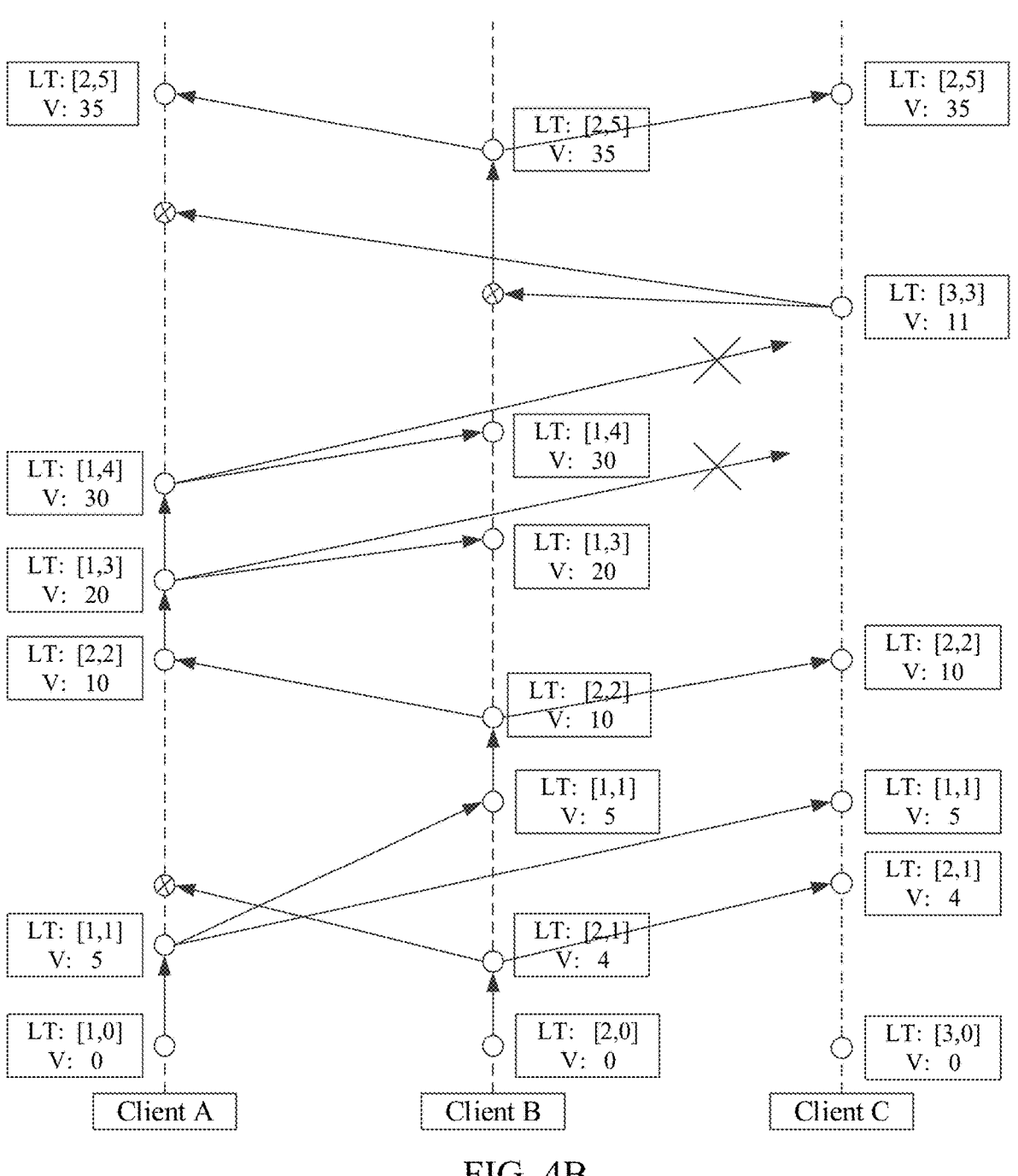
FIG. 4B is a schematic diagram of a flow of playlist synchronization update of the present disclosure.

Embodiments of the present disclosure will be described in more detail below with reference to the accompanying drawings.

It should be understood that the various steps recorded in the implementations of the methods of the present disclosure can be performed according to different orders and/or performed in parallel. In addition, the implementations of the methods can include additional steps and/or omit performing the steps illustrated. The scope of the present disclosure is not limited in this aspect.

The term "comprise/include" and variations thereof as used in this article are openly comprising/including, namely "comprising/including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the following description.

It should be noted that the concepts, such as "first" and "second", mentioned in the present disclosure are only used to distinguish different apparatuses, modules, or units, and are not intended to limit orders or interdependence relationships of functions performed by these apparatuses, modules, or units.

It should be noted that the modifications of "one" and "more/plurality" mentioned in the present disclosure are schematic rather than restrictive, and those skilled in the art should understand that unless otherwise explicitly stated in the context, it should be understood as "at least one".

The names of messages or information interacted between a plurality of apparatuses in the implementations of the present disclosure are used for illustrative purposes only and are not used to limit the scope of such messages or information.

Embodiment 1

FIG. 1 is a flow chart of a synchronization method of playing information provided by Embodiment 1 of the present disclosure. This embodiment can be applied to the current client to update the current playing information according to the playing synchronization messages from other clients in the playing group. The method can be executed by the synchronization apparatus of playing information in the embodiments of the present disclosure, the apparatus can be implemented by software and/or hardware and integrated in the client, and the client can be installed in a terminal device such as a mobile phone or a computer. The method includes the following steps:

S110: in response to obtaining a playing synchronization message sent by any one second client of at least one second client in a playing group, updating current playing information according to the playing synchronization message.

The playing group is a playing group of audio and/or video information created by a user, each user in the playing group has the same play control authority, and respective clients display the same playing information. The client includes an Application (APP) installed in the terminal device; the playing information includes information about the audio and video currently being played, playing progress, playing volume, playing status (pause, stop, or play), playlist, and other business information (for example, whether it is liked or whether it is favorited), etc. The playing synchronization message is a playing information update message sent by the client to other clients after the client detects that the playing information of the user changes. The client sends the current playing information to other clients in the playing group to guide the other clients to complete the update of the playing information to ensure that the playing information displayed by respective clients in the playing group is consistent.

A first client, in response to obtaining an instruction for creating a playing group sent by the user, creates the playing group and records a group identifier of the playing group and an in-group serial number of the first client in the playing group; the group identifier is identification information assigned by the server for the playing group; the in-group serial number is an in-group identifier assigned to each client by the server according to the order in which the clients join the playing group. When the first client is a creator of the playing group, it is obvious that the in-group serial number of the first client is 1, that is, the first client is the first one client to be added into the playing group. The first client, in response to obtaining a sharing instruction for the playing group sent by the user, sends an invitation request of the playing group to at least one target client, so as to guide the target client to join the playing group.

The first client responds to the obtained invitation request of the playing group sent by another client, presents the invitation request to the user, and, upon obtaining a join instruction sent from the user, joins the playing group and records the group identifier of the playing group and the in-group serial number of the first client in the playing group. When the first client is a non-creator of the playing group, it is obvious that the in-group serial number of the first client is not 1, and the server assigns the in-group serial number to the first client according to the order in which the first client joins the playing group. For example, if the first client is the second one client to be added into the playing group, the in-group serial number assigned to the first client by the server is 2.

S120, displaying matched target playing information in response to obtaining a user operation instruction, and sending the target playing information to the at least one second client in the playing group through the playing synchronization message, so that the at least one second client updates respective playing information according to the target playing information.

The user operation instruction, that is, a broadcast control operation that the user performs in the playing group, includes pausing playback, starting playback, switching to the next song, switching the loop mode of the list, adjusting the playing progress, and other business operations (for example, like and favorite), etc., and also includes operations, such as adding a play item to the playlist, deleting a play item from the playlist, and adjusting a position of a play item.

After obtaining the user operation instruction, the client responds to the user operation instruction, that is, displays the target playing information matched with the user operation instruction, and at the same time, can send the target playing information to other clients completely through a playing synchronization message, or can also split the target playing information and send it to other clients in batches through a plurality of playing synchronization messages, and the other clients described above complete the update according to the target playing information in the one or more playing synchronization messages. The target playing information can also be stored in the server, and the identification information of the target playing information can be sent to other clients through the playing synchronization message, and the other clients described above can obtain the target playing information stored in the server according to the identification information of the target playing information, and thus update the playing information, thereby ensuring that the playing information of all clients in the playing group is consistent.

Optionally, in the embodiments of the present disclosure, the synchronization method of playing information comprises: in response to obtaining a voice call instruction, setting a voice call button in a current display page to be in a lit state, and sending a first voice message that is obtained to the at least one second client, so that the at least one second client broadcasts the first voice message; in response to acquiring a second voice message sent by any one of the at least one second client in the playing group, playing the second voice message, and displaying a broadcast dynamic effect through avatar information of the second client matched in the current display page; in response to obtaining a business operation identifier sent by any one of the at least one second client in the playing group, updating a matching business icon in the current display page according to the business operation identifier, the business operation identifier including play item like and play item favorite; and in response to obtaining a playing group end instruction sent by any one of the at least one second client in the playing group, displaying a playing record of the playing group.

After the user clicks on the voice call button to turn on a voice call function, the client sets the voice call button to be in a lit state, and sends the voice message sent by the user to other clients in the playing group, so that each client in the playing group has the voice communication function while achieving to share the broadcast control in the playing group, which enhances the communication convenience between clients; when the voice message sent by another client in the playing group is obtained, while playing the voice message, the matching broadcast dynamic effect is displayed through the avatar information of the sender of the voice message, so that the avatar information of the sender of the current voice message is different from other clients; when the client obtains broadcast control actions such as play item like or play item favorite sent by other clients in the playing group, the client display the business icon in different forms according to the number of the liked or favorited clients.

For example, when acquiring the play item favorite operation sent by other clients in the playing group, if only one client in the playing group has favorited the play item, then a single heart-shaped icon is used to show that the play item has been favorited by one client; if two clients in the playing group have favorited the play item, a double-heart nested icon is used to show that the play item has been favorited by two clients, so as to improve the interest of displaying the information; when the client obtains a playing group end instruction sent by other clients or detects itself that a user sends a playing group end instruction, the client displays a playing record of the playing group, such as the current playing time, the number of play items that have been played to completion, the number of play items that are liked by at least two clients, the number of play items that are collected by at least two clients, and so on, so as to provide a complete playing record of the playing group for the respective clients.

According to the technical scheme of the embodiments of the present disclosure, when the first client obtains the playing synchronization message sent by the second client in the playing group, the first client updates the current playing information according to the playing synchronization message, and when the user operation instruction is obtained, the first client sends the current playing information to other clients in the playing group through the playing synchronization message, so that the other clients can update their respective playing information, which ensures the consistency of the playing information of the respective clients in the playing group, and at the same time, makes all users in the playing group have the same control authority, thus improving the sharing participation of the users.

Embodiment 2

FIG. 2 is a synchronization method of playing information provided by Embodiment 2 of the present disclosure. This embodiment is refined on the basis of the above embodiments. In the embodiment of the present disclosure, when the playing synchronization message is a list synchronization message and an identifier of a first playlist in the list synchronization message is the same as an identifier of a current playlist, the current playlist is updated according to a partition summary of the first playlist in the list synchronization message and a partition summary of the current playlist. The method includes:

S210: in response to obtaining a list synchronization message sent by any one second client of the at least one second client in the playing group, judging whether an identifier of a first playlist in the list synchronization message is identical with an identifier of a current playlist.

The list synchronization message is a prompt message of playlist synchronization update that the client sends to other clients in the playlist after the client detects the playlist update operation of the user, and the client sends the identifier of the current playlist to other clients in the playlist to guide other clients to complete the update of the playlist, so as to ensure that the playlists displayed by the respective clients in the playing group are consistent; the identifier of the playlist is the identity information of the playlist, in the embodiments of the present disclosure, the identifier of the playlist can be generated based on universally unique identifier (UUID) technology to ensure the uniqueness of the identifier of the playlist. When the client detects a list switching action by the user, the local playlist is switched to a new playlist, and the playlist identifier is changed accordingly; however, when there are operations, such as adding, deleting, and adjusting the position of the play item, in the playlist, the above operations can be regarded as the change of the play item within the same playlist, that is, the playlist identifier does not change at this time; especially, when the client detects a random play operation by the user based on the current playlist (that is, triggering a shuffle function instruction), because the playing positions of the play items in the playlist change greatly, it is also regarded as switching to a new playlist, that is, the playlist identifier is changed accordingly at this time.

Optionally, in the embodiments of the present disclosure, displaying the matched target playing information in response to obtaining the user operation instruction and sending the target playing information to the at least one second client in the playing group through the playing synchronization message includes: displaying a corresponding second playlist in response to obtaining a list switching instruction, and obtaining an identifier of the second playlist and partition information of the second playlist, the partition information comprising a partition identifier and a partition summary; and sending the list synchronization message to the at least one second client in the playing group, so that the at least one second client updates respective playlists according to the identifier of the second playlist and the partition information of the second playlist.

When the client detects the list switching instruction from the user, that is, when the user switches the playlist to a new playlist, or the client obtains the shuffle function instruction, the client responds to the list switching instruction, that is, displays the playlist (that is, the second playlist) corresponding to the instruction, and obtains the identifier of the second playlist; and then divides the play items in the second playlist into at least one partition according to a play item threshold; the play item threshold can be set as required, for example, the play item threshold is set to 100, that is, every 100 play items are set as a partition, and it is assumed that the second playlist includes 256 play items, that is, play items 1 to 100 are a first partition, play items 101 to 200 are a second partition, and play items 201 to 256 are a third partition.

At the same time, a partition identifier is set for each partition, a partition summary of each partition is calculated, and the partition summary is related to the play item identifiers in the partition; for example, after the play item identifiers in each partition are connected in turn, the partition summary of the current partition is calculated by MD5 message-digest algorithm or secure hash algorithm 1 (SHA1), etc. Further, the client sends the list synchronization message to the other clients in the playing group to guide the other clients to update their respective playlists according to the identifier of the second playlist, the partition identifier of the second playlist, and the partition summary of the second playlist, so as to ensure that all clients in the playing group display the same playlist.

Optionally, in the embodiments of the present disclosure, displaying the matched target playing information in response to obtaining the user operation instruction and sending the target playing information to the at least one second client in the playing group through the playing synchronization message includes: in response to obtaining a list adjustment instruction, displaying a corresponding third playlist, and obtaining partition information of a target partition associated with play item adjustment; and sending the list synchronization message to the at least one second client in the playing group, so that the at least one second client updates respective playlists according to an identifier of the third playlist and the partition information of the target partition.

The list adjustment instruction indicates the operations, such as adding, deleting and adjusting the position of play items, that the user triggers in the current playlist, and the client responds to the list adjustment instruction, that is, displays the playlist (that is, the third playlist) corresponding to the instruction; when the user triggers an adding operation for the play item, the client allocates the newly inserted play item and the adjacent play item before the newly inserted play item into the same partition. Taking the above technical scheme as an example, a play item is inserted after a play item 105, and both the newly inserted play item and the play item 105 are located in the second partition; if a play item is inserted after a play item 100 and the newly inserted play item is located in the first partition, and at this time, the first partition includes 101 play items, which is allowed to exceed the play item threshold; if a play item is inserted at the front end of the playlist, the play item is assigned to the first partition; in particular, the position adjustment operation can be regarded as deleting a play item at the position before adjustment and adding a play item at the position after adjustment, that is, a position adjustment operation can be regarded as a combination of an adding operation and a deleting operation.

As described in the above technical scheme, after the list adjustment instruction is obtained, the playlist identifier is unchanged, the number of partitions is unchanged, the partition identifier of each partition remains the same, the summary of the partition where the play item has not changed is unchanged, and the summary of the partition where the play item has changed needs to be recalculated; then the client sends the list synchronization message to other clients in the playing group, so that the other clients can update their respective playlists according to the identifier of the third playlist and the partition information of the target partition. By sending the partition information of the target partition, the amount of the data transmission between the clients is reduced, so that the client only needs to update the partition where there is a change in the play item, and the synchronous updating efficiency of the playlist is improved.

S220: in response to the identifier of the first playlist being identical with the identifier of the current playlist, comparing a partition summary of the first playlist in the list synchronization message with a partition summary of the current playlist to obtain a difference partition where there is a difference in play items, and obtaining play item information of the difference partition through a matched second client to update the current playlist.

If the obtained identifier of the first playlist is the same as the identifier of the current playlist, it indicates that the playlist displayed by the second client is the same as that of the first client, however, the play items in the second client are inconsistent with those in the first client due to the operations such as addition, deletion, or position adjustment on the play items in the second client, so that the partition summary of the first playlist is compared with the partition summary of the current playlist to obtain a difference partition in which there is a difference in play items, and an identifier of the difference partition identifier is sent to the second client, so that the second client sends play item information under the partition corresponding to the identifier of the difference partition to the first client, and the first client updates the corresponding partition according to the acquired play item information under the difference partition; the play item information is the detailed information of the play item, which may include information such as name, author, release time, duration, and the like.

If the obtained identifier of the first playlist is different from the identifier of the current playlist, it indicates that the second client and the first client are currently displaying different playlists. The list switching action is performed in the second client, therefore, the first client needs to obtain the play item information under all partitions in the first playlist, and then the first client updates its own playlist according to the obtained play item information under all partitions in the first playlist, so as to ensure that the first client and the second client display the same play item information.

Optionally, in the embodiments of the present disclosure, the list synchronization message further includes play item information of at least one partition; before judging whether the identifier of the first playlist in the list synchronization message is the same as the identifier of the current playlist, the method further comprises: updating a corresponding partition in the current playlist according to the play item information of the at least one partition in the list synchronization message; after judging whether the identifier of the first playlist in the list synchronization message is the same as the identifier of the current playlist, the method further comprises: if the identifier of the first playlist is the same as the identifier of the current playlist, obtaining identifiers of other partitions than the at least one partition according to the partition summary of the first playlist in the list synchronization message and the partition summary of the current playlist, and sending a slice request message to the matched second client to obtain play item information corresponding to the identifiers of the other partitions.

In the list synchronization message sent by the client, the identifier of the playlist, the partition identifier, and the partition summary usually only need to occupy less storage space. In order to make full use of the transmission space of the list synchronization message, the play item information of the at least one partition can be added to the list synchronization message. When a client sends a list synchronization message based on a list switching instruction, play item information of one or more partitions with the smallest partition serial number is added into the list synchronization message; when a client sends a list synchronization message based on a list adjustment instruction, play item information of one or more partitions related to the play item adjustment and having the smallest partition serial number is added into the list synchronization message. When the other client in the playing group obtains the list synchronization message, the other client directly completes the updating of the corresponding partition according to the play item information, so as to improve the update efficiency of the playlist. At the same time, because the list synchronization message sent by the second client already includes the play item information of the at least one partition, and the first client has completed the updating of the play items of some partitions based on the above-mentioned at least one partition, when the first client sends the slice request message to the second client, the partitions that have completed the updating of the play item will not be acquired repeatedly, and only the play item information of the partitions except the above-mentioned at least one partition can be acquired, so as to reduce the frequency and amount of data transmission between clients.

Optionally, in the embodiments of the present disclosure, the synchronization method of playing information further comprises: in response to obtaining a slice request message sent by any one second client of the at least one second client in the playing group, judging whether an identifier of a fourth playlist in the slice request message is identical with the identifier of the current playlist; in response to the identifier of the fourth playlist being identical with the identifier of the current playlist, sending play item information to the matched second client according to a partition identifier in the slice request message; and in response to the identifier of the fourth playlist being different from the identifier of the current playlist, abandoning the slice request message.

When the first client obtains the slice request message sent by the second client, if the identifier of the fourth playlist in the slice request message is the same as the identifier of the current playlist, it indicates that the same playlist is currently displayed in the first client and the second client, and then according to the partition identifier in the slice request message, play item information under the matching partition is sent to ensure the consistency of the play item information in the playlist; if the identifier of the fourth playlist in the slice request message is different from the identifier of the current playlist, it indicates that the first client and the second client are currently displaying different playlists. Because the playlists are different, the partition identifier in the slice request message no longer exists in the playlist of the first client, and in this case, the slice request message is discarded.

Optionally, in the embodiments of the present disclosure, after obtaining the identifier of the second playlist and the partition information of the second playlist, the method further comprises: sending play item information of the second playlist to the at least one second client through at least one list synchronization message, so that the at least one second client updates the respective playlists according to the play item information of the second playlist. After obtaining the list switching instruction, the client essentially needs to send the entire playlist to the other clients in the playing group to ensure that the playlists of respective clients in the playing group are consistent. However, when the entire playlist comprises a lot of play item information, it is impossible to complete the transmission of all play item information through one list synchronization message. Therefore, the play items in various partitions can be sent to other clients in batches. For example, each list synchronization message includes play item information under a partition, that is, by sending a plurality of list synchronization messages in sequence, the play item information of the current playlist is completely sent to other clients, so as to ensure that the play item information in each client is consistent when the playlist of the client changes.

According to the technical scheme of the embodiments of the present disclosure, in response to obtaining the list synchronization message sent by the second client in the playing group, if the identifier of the first playlist is the same as the identifier of the current playlist, the partition summary of the first playlist in the list synchronization message is compared with the partition summary of the current playlist to obtain a difference partition with the difference in play items, and play item information of the difference partition is obtained through the second client, so as to ensure that the playlists of all clients in the playing group are consistent, reduce the amount of data transmitted between clients, save the occupied communication resources, and at the same time, improve the transmission rate between clients, achieve the timely update of playlists, and ensure the real-time performance of shared broadcast control.

Embodiment 3

FIG. 3 is a synchronization method of playing information provided by Embodiment 3 of the present disclosure. This embodiment is refined on the basis of the above embodiments. In the embodiments of the present disclosure, when the playing synchronization message is a list synchronization message and the identifier of the first playlist in the list synchronization message is different from the identifier of the current playlist, according to the identifier of the first playlist, the play item information of the first playlist stored by the server is obtained to update the current playlist. The method includes:

S310: in response to obtaining a list synchronization message sent by any one second client of the at least one second client in the playing group, judging whether an identifier of a first playlist in the list synchronization message is identical with an identifier of a current playlist.

In the embodiments of the present disclosure, the playlist identifier can be obtained through the server; the playlist identifier can be generated based on the UUID technology to ensure the uniqueness of the playlist identifier; when the client detects a list switching action by the user, the local playlist is switched to a new playlist, and the playlist identifier is changed accordingly; when operations such as adding, deleting, and adjusting the position of the play item are detected in the playlist, the above operations are also regarded as changes in the playlist, that is, the playlist identifier is also changed at this time. Especially, when the client detects a random play operation from the user based on the current playlist (that is, triggering a shuffle function instruction), because the playing positions of the play items in the playlist change greatly, it is also regarded as switching to a new playlist, that is, the playlist identifier is changed accordingly at this time.

Optionally, in the embodiments of the present disclosure, displaying the matched target playing information in response to obtaining the user operation instruction, and sending the target playing information to the at least one second client in the playing group through the playing synchronization message, further comprises: in response to obtaining a list switching instruction, displaying a corresponding fifth playlist, and sending a play item identifier of the fifth playlist to a server, so that the server stores the fifth playlist; and obtaining an identifier of the fifth playlist sent by the server, and sending the list synchronization message to the at least one second client, so that the at least one second client updates respective playlists according to the identifier of the fifth playlist.

In response to the list switching instruction, the client displays the playlist (i.e. the fifth playlist) corresponding to the instruction; then send the identifiers of the respective play items (for example, song, opera, etc.) in the fifth playlist to the server; after the server obtains the above identifiers of the play items, the server stores the corresponding fifth playlist and allocates the identifier of the fifth playlist to the fifth playlist; after obtaining the identifier of the fifth playlist sent by the server, the client sends the list synchronization message to the other clients in the playing group, so as to guide the other clients to update their respective playlists according to the identifier of the fifth playlist, thus ensuring the synchronization of the playlists of various clients in the playing group.

Optionally, in the embodiments of the present disclosure, displaying the matched target playing information in response to obtaining the user operation instruction, and sending the target playing information to the at least one second client in the playing group through the playing synchronization message, further comprises: in response to obtaining a list adjustment instruction, obtaining a first difference play item identifier according to a sixth playlist before adjustment and a seventh playlist after adjustment; sending the first difference play item identifier and an identifier of the sixth playlist to a server, so that the server stores the seventh playlist according to the first difference play item identifier and the identifier of the sixth playlist; and obtaining an identifier of the seventh playlist sent by the server, and sending the list synchronization message to the at least one second client, so that the at least one second client updates respective playlists according to the identifier of the seventh playlist.

The client responds to the list adjustment instruction to display the playlist (i.e., the seventh playlist) corresponding to the instruction, and obtains the identifier (i.e., the first difference play item identifier) of a play item that has difference before and after the adjustment based on the playlist (i.e., the sixth playlist) before responding the instruction and the playlist (i.e., the seventh playlist) after responding the instruction. In particular, the position adjustment operation can be regarded as deleting a play item at the position before adjustment and adding a play item at the position after adjustment, so that the position adjustment operation can be regarded as a combination of an adding operation and a deleting operation. As described in the above technical scheme, the playlist before adjustment (i.e., the sixth playlist) has been stored in the server, so that after sending the first difference play item identifier and the identifier of the sixth playlist to the server, the server can obtain the locally stored sixth playlist according to the identifier of the sixth playlist, obtain the seventh playlist according to the first difference play item identifier and the sixth playlist, and assigns the identifier of the seventh playlist to the seventh playlist. After obtaining the identifier of the seventh playlist sent by the server, the client sends the list synchronization message to other clients in the playing group, so that the other clients can update their respective playlists according to the identifier of the seventh playlist. Through sending the first difference play item identifier to the server by the client, so as to reduce the amount of the data transmission between the client and the server and improve the data transmission efficiency.

Optionally, in the embodiments of the present disclosure, obtaining the first difference play item identifier according to the sixth playlist before adjustment and the seventh playlist after adjustment includes: according to the sixth playlist before adjustment and the seventh playlist after adjustment, obtaining a first difference file comprising the first difference play item identifier through a difference comparison tool. Sending the first difference play item identifier and the identifier of the sixth playlist to the server to enable the server to store the seventh playlist according to the first difference play item identifier and the identifier of the sixth playlist includes: sending the first difference file and the identifier of the sixth playlist to the server, so that the server stores the seventh playlist according to the first difference file and the identifier of the sixth playlist.

Exemplarily, the difference comparison tool is a Diff tool. The client composes the play item identifiers in the sixth playlist into an identification string and composes the play item identifiers in the seventh playlist into an identification string, respectively, and the respective play item identifiers are connected by a separator (e.g., \n). The above two identification strings are compared by the Diff tool to obtain a difference file (i.e., a patch file) describing the differences between the above two identification strings. The server parses the patch file through a patch file parsing tool, and then obtains the seventh playlist by combining it with the sixth playlist stored locally; when the client sends the update information of the playlist, the client sends the difference file through the difference comparison tool, which not only improves the acquisition efficiency and the transmission efficiency of the first difference play item, but also improves the accuracy of the difference comparison.

Optionally, in the embodiment of the present disclosure, according to the sixth playlist before adjustment and the seventh playlist after adjustment, obtaining the first difference file comprising the first difference play item identifier through the difference comparison tool includes comparing the sixth playlist before adjustment with the seventh playlist after adjustment by the difference comparison tool to obtain the first difference file comprising the first difference play item identifier. For example, the sixth playlist and the seventh playlist can also be compared line by line through the Diff tool, and the first difference file records the change of each line, that is, the line is a deleted line, the line is an added line, or the line remains unchanged, thus avoiding the construction and parsing of the identification string in the above technical scheme and improving the efficiency of obtaining the difference file.

S320: in response to the identifier of the first playlist being different from the identifier of the current playlist, obtaining play item information of the first playlist stored in a server according to the identifier of the first playlist, so as to update the current playlist.

If the identifier of the first playlist is different from the identifier of the current playlist, it indicates that the second client has updated the playlist. At this time, according to the identifier of the first playlist, the play item information of the first playlist stored in the server, such as the name, the author, the release time, the duration, and other related information of the play item, is obtained, and then the playlist is updated according to the above obtained play item information, so as to keep the playlist of the first client consistent with that of the second client. If the identifier of the first playlist is the same as the identifier of the current playlist, it indicates that the second client and the first client display the same playlist, and the second client has not updated the playlist, and the list synchronization message is abandoned at this time.

Optionally, in the embodiments of the present disclosure, obtaining the play item information of the first playlist stored in the server according to the identifier of the first playlist, so as to update the current playlist, includes: according to the identifier of the first playlist, obtaining a play item identifier of the first playlist through the server, and obtaining a second difference play item identifier according to the play item identifier of the first playlist and a play item identifier of the current playlist; and according to the second difference play item identifier, obtaining second difference play item information stored in the server to update the current playlist.

For example, after the client obtains the play item identifier of the first playlist through the server according to the identifier of the first playlist, the client can obtain, through the Diff tool, the play item identifiers of the newly added play item and the deleted play item, that is, the second difference play item identifier, according to the play item identifier of the first playlist and the play item identifier of the current playlist. Further, according to the second difference play item identifier, the second difference play item information stored by the server is obtained, and the current playlist of the first client is updated according to the second difference play item information; when the client obtains the play item information to be updated, the client reduces the amount of the data transmission between the client and the server and improves the data transmission efficiency by sending the second difference play item identifier to the server.

According to the technical scheme of the embodiments of the present disclosure, in response to obtaining the list synchronization message sent by the second client in the playing group, if the identifier of the first playlist is different from the identifier of the current playlist, the play item information of the first playlist stored by the server is obtained according to the identifier of the first playlist, so as to update the current playlist, which ensures that the playlists of the respective clients in the playing group are updated synchronously, compared with the playlist transmission between clients, the data transmission rate between the client and the server is faster, which achieves timely updating of playlists and ensures the real-time performance of shared broadcast control.

Embodiment 4

FIG. 4A is a synchronization method of playing information provided by Embodiment 4 of the present disclosure. This embodiment is refined on the basis of the above embodiments. In the embodiments of the present disclosure, before judging whether the identifier of the first playlist in the list synchronization message is the same as the identifier of the current playlist, the method also includes judging whether a first broadcast control action number in the list synchronization message is greater than a current broadcast control action number. The method includes:

S410: obtaining a list synchronization message sent by any one of at least one second client in the playing group; executing S420.

S420: judging whether the first broadcast control action number in the list synchronization message is greater than the current broadcast control action number; the first broadcast control action number comprising a broadcast control count value and an in-group serial number of the second client in the playing group; in response to the first broadcast control action number being greater than the current broadcast control action number, executing S430; in response to the first broadcast control action number being smaller than or equal to the current broadcast control action number, executing S450.

The first client, in response to obtaining an instruction of creating a playing group sent by the user, creates the playing group and records a group identifier of the playing group and an in-group serial number of the first client in the playing group; the group identifier is identification information allocated by the server for the playing group; the in-group serial number is an in-group identifier assigned to each client by the server according to the order in which the clients join the playing group. When the first client is a creator of the playing group, it is obvious that the in-group serial number of the first client is 1, that is, the first client is the first one client to join the playing group. The first client, in response to obtaining the sharing instruction of the playing group sent by the user, and sends an invitation request of the playing group to at least one target client, so as to guide the target client to join the playing group.

The first client, in response to obtaining the invitation request of the playing group sent by the other client in the playing group, shows the invitation request to the user, and joins the playing group and records the group identifier of the playing group and the in-group serial number of the first client in the playing group when obtaining the join instruction sent by the user. When the first client is a non-creator of the playing group, the server assigns the in-group serial number to the first client according to the order in which the first client joins the playing group. For example, the first client is the second one client to join the playing group, the in-group serial number assigned to the first client by the server is 2.

When the user performs a broadcast control operation in the playing group through the client, the client assigns a broadcast control action number for each broadcast control operation; the broadcast control action number includes the in-group serial number and the broadcast control count value, and can be expressed by $K=[M, N]$; where $K$ is the broadcast control action number, $M$ is the in-group serial number, and $N$ is the broadcast control count value. The in-group serial number is an in-group serial number of the current client in the playing group, and the broadcast control count value is the number of broadcast control operations triggered by all clients in the playing group recorded by the current client. When the client obtains the broadcast control operation by the user, the client will add 1 to the current broadcast control count value. For example, the broadcast control count value in the current broadcast control action number of the first client is 4, the first client adds 1 to the broadcast control count value when obtaining the broadcast control operation by the user, i.e., updates the broadcast control count value to 5. In the embodiments of the present disclosure, the broadcast control operation includes operations such as, switching to a new playlist, random play operation in the playlist, adding the play item, deleting the play item, and adjusting the position of the play item.

When two broadcast control action numbers are compared, they are compared by comparing the broadcast control count values. The larger the broadcast control count value, the larger the broadcast control action number, the smaller the broadcast control count value, the smaller the broadcast control action number. When the broadcast control count values of the two broadcast control action numbers are equal, the two broadcast control action numbers are compared by comparing the in-group serial numbers, the smaller the in-group serial number is, indicating that the earlier the client joins the playing group, the larger the in-group serial number is, indicating that the later the client joins the playing group. Therefore, when the broadcast control count values of the two broadcast control action numbers are equal, the broadcast control action number of the client that joins the playing group earlier is larger, so as to ensure that when the broadcast control count values are equal, the creator of the playing group (the in-group serial number is 1) and the earlier joiners (the in-group serial number is smaller) control the playing information, and ensuring the consistency of the playing information of each client in the playing group at the same time.

Especially, when the first client joins the playing group as the creator of the playing group, a current broadcast control action number at an initial moment is [1,0], which means that the current broadcast control action number is a broadcast control action number of the broadcast control operation action triggered by itself, so that the in-group serial number is its own in-group serial number which is 1, and at the same time, because no client in the playing group triggers the broadcast control operation action, the broadcast control count value is 0. When the first client is not the creator of the playing group, and joins the playing group as a K-th client, the current broadcast control action number at the initial moment is [K, 0], which means that the current broadcast control action number is the broadcast control action number of the broadcast control operation action triggered by itself, so that the in-group serial number is its own in-group serial number which is K. At the same time, because no client in the playing group triggers the broadcast control operation action, the broadcast control count value is 0. In the embodiments of the present disclosure, the list synchronization message is implemented based on Declarative programming, so as to avoid, through declarative synchronization message protocol, the loss of playing information, which will lead to the problem of permanent inconsistency of playing information.

S430: updating the current broadcast control action number to the first broadcast control action number; executing S440.

If the obtained first broadcast control action number sent by the second client is greater than the current broadcast control action number, the current broadcast control action number is updated to the first broadcast control action number.

S440: judging whether the identifier of the first playlist in the list synchronization message is identical with the identifier of the current playlist.

S450: abandoning the list synchronization message.

If the obtained first broadcast control action number sent by the second client is smaller than the current broadcast control action number, the received list synchronization message is abandoned to ensure that when the second client recovers from a weak network or disconnected network state to a normal network state and sends the playlist identifier, the first client does not adopt the list synchronization message, so as to avoid the phenomenon that the first client jumps back to the information of the playlist, resulting in incoherent playing. Taking the schematic flowchart of synchronous playing shown in FIG. 4B as an example. In FIG. 4B, the broadcast control action number is represented by "LT" and the playlist is represented by "V". The value of "V" itself has no practical significance and can be any value, and is only used to indicate whether the playlists in the respective clients are the same. If the values are the same, it means that the playlists are the same. If the values are different, it means that the current playlists are different.

As shown in FIG. 4B, after a client A creates a playing group, a client B and a client C join the playing group in turn; at the initial moment, the current broadcast control action numbers of the client A, the client B, and the client C are [1,0], [2,0], and [3,0], respectively, which indicates that the current broadcast control action numbers are all broadcast control action numbers of the playlist update operation triggered by the clients themselves, and because none of the clients in the playing group triggers the playlist update operation, the above clients do not obtain any playlist update operation, and therefore, the broadcast control count values are all 0. At this time, the playlists of the client A, the client B, and the client C are the same, and are all preset initial playing information (for example, showing a blank directory without songs), which is represented by V: 0; then the client B performs a playlist update operation (i.e., a playlist switching operation or a playlist adjustment operation), the client B adds 1 to the current broadcast control count value (i.e. 0), the current broadcast control action number is changed to [2,1], and the playlist is changed to V: 4; the client B sends LT: [2,1] and V: 4 to the client A and the client C.

Before the client A obtains the list synchronization message sent by the client B, the client A itself also performs a playlist update operation, and the client A adds 1 to the current broadcast control count value (i.e. 0). At this time, the current broadcast control action number of the client A is changed to [1,1] and the playlist is changed to V: 5. After receiving the list synchronization message sent by the client B, the client A compares the current broadcast control action number [1,1] with the received broadcast control action number [2,1], and determines that [1, 1] is greater than [2, 1] based on the above comparison rules, that is, the current broadcast control action number is greater than the received broadcast control action number, so that the list synchronization message is abandoned (corresponding to the node indicated by ⊗ in FIG. 4B), that is, the current broadcast control action number [1,1] is retained, and the playlist is still the original playlist V: 5 and is not updated according to the playlist V: 4 of the client B. After obtaining the list synchronization message sent by the client B, the client C compares the current operation version number [3,0] with the received operation version number [2,1] and determines that [3,0] is less than [2,1], that is, the current broadcast control action number is less than the received broadcast control action number, so that the client C updates the current broadcast control action number to LT: [2,1] and updates the playlist to V: 4.

After the client A changes the current broadcast control action number to [1,1] and changes the playlist to V: 5, the client A sends LT: [1,1] and V: 5 to the client B and the client C; the client B compares the current broadcast control action number [2, 1] with the received broadcast control action number [1,1], and determines that [2,1] is less than [1,1], that is, the current broadcast control action number is less than the received broadcast control action number, so that the current broadcast control action number is updated to LT: [1,1] and the playlist is updated to V: 5. The client C compares the current broadcast control action number [2,1] with the received broadcast control action number [1,1], and determines that [2, 1] is less than [1,1], that is, the current broadcast control action number is less than the received broadcast control action number. Therefore, the client C also updates the current broadcast control action number to LT: [1,1], and updates the playlist to V: 5, thus ensuring that the playlists of the respective clients in the playing group are consistent.

Then the client B performs a playlist update operation again, and the client B adds 1 to the current broadcast control count value (that is, 1), so that the current broadcast control action number is changed to [2,2], and the playlist is changed to V: 10; the client B sends LT: [2,2] and V: 10 to the client A and the client C; the client A compares the current broadcast control action number [1,1] with the received broadcast control action number [2,2], and determines that [1,1] is less than [2,2], that is, the current broadcast control action number is less than the received broadcast control action number, so that the current broadcast control action number is updated to LT: [2,2] and the playlist is updated to V: 10. The client C compares the current broadcast control action number [1,1] with the received broadcast control action number [2,2], and determines that [1, 1] is less than [2,2], that is, the current broadcast control action number is less than the received broadcast control action number, so that the current broadcast control action number is updated to LT: [2,2], and the playlist is updated to V: 10, thus again ensuring that the playlists of the respective clients in the playing group are consistent.

Next, the client A performs a playlist update operation again, and the client A adds 1 to the current broadcast control count value (that is, 2). At this time, the current broadcast control action number of the client A is changed to [1,3], and the playlist of the client A is V: 20, and the client A sends LT: [1,3] and V: 20 to the client B and the client C; the client B compares the current broadcast control action number [2,2] with the received broadcast control action number [1,3], and determines that [2,2] is less than [1,3], that is, the current broadcast control action number is less than the received broadcast control action number, therefore, the client B updates the current broadcast control action number to LT: [1,3] and updates the playlist to V: 20. Because the client C is in a disconnected network state (or a weak network state), the client C does not obtain the list synchronization information sent by the client A. Therefore, the current broadcast control action number in the client C is still [2,2], and the playlist is still the original playlist V: 10.

After that, the playlist update operation is performed again in the client A, and the client A adds 1 to the current broadcast control count value (that is, 3). At this time, the current broadcast control action number of the client A is changed to [1,4], and the playlist is V: 30, the client A sends LT: [1,4] and V: 30 to the client B and the client C. The client B compares the current broadcast control action number [1,3] with the received broadcast control action number [1,4], and determines that [1,3] is less than [1,4], that is, the current broadcast control action number is less than the received broadcast control action number, so that the client B updates the current broadcast control action number to LT: [1,4] and updates the playlist to V: 30. The client C is still in the disconnected network state (or the weak network state), and does not receive the broadcast information sent by the client A. Therefore, the current broadcast control action number in the client C is still [2,2], and the playlist is still the original playlist V: 10.

After the network state of the client C returns to normal, the client C performs a playlist update operation, and the client C adds 1 to the current broadcast control count value (that is, 2). At this time, the current broadcast control action number of the client C is changed to [3,3], and the playlist is V: 11, and the client C sends LT: [3,3] and V: 11 to the client A and the client B. After receiving the list synchronization message sent by the client C, both the client A and the client B compare the current broadcast control action number [1,4] with the received broadcast control action number [3,3], and determine that [1,4] is greater than [3,3], that is, the current broadcast control action number is greater than the received broadcast control action number. Therefore, the list synchronization message is abandoned, that is, the current broadcast control action number LT: [1,4] is retained, the playlist is still the original playlist V: 30 and is not updated according to the playlist V: 11 of the client C, which ensures that when the client C is restored to the normal network state from the weak network or disconnected network state, and sends the playlist, the client A and the client B do not adopt the list synchronization message, so as to avoid the phenomenon that the client A and the client B jump back to the playlist, resulting in incoherent playing. At the same time, it also ensures that the playlists of the client A and the client B which are in the normal network state in the playing group are consistent.

Then the client B performs a playlist update operation again, and the client B adds 1 to the current broadcast control count value (i.e. 4), and the current broadcast control action number is changed to [2,5], and the playlist is changed to V: 35; the client B sends LT: [2,5] and V: 35 to the client A and the client C. The client A compares the current broadcast control action number [1,4] with the received broadcast control action number [2,5], and determines that [1,4] is less than [2,5], that is, the current broadcast control action number is less than the received broadcast control action number, so that the current broadcast control action number is updated to LT: [2,5] and the playlist is updated to V: 35. The client C compares the current broadcast control action number [3,3] with the received broadcast control action number [2,5], and determines that [3,3] is less than [2,5], that is, the current broadcast control action number is less than the received broadcast control action number, so that the current broadcast control action number is updated to LT: [2,5], and the playlist is updated to V: 35, which again ensures that the playlists of the respective clients in the playing group are consistent.

According to the technical scheme of the embodiments of the present disclosure, the list synchronization message sent by the other client in the playing group is obtained, and when it is judged that the first broadcast control action number in the list synchronization message is greater than the current broadcast control action number of the current client, the current broadcast control action number is updated as the first broadcast control action number, and the current playlist is updated according to the playlist identifier in the list synchronization message, so that all users in the playing group have the same control authority, and the sharing participation of the users is improved, and the consistency of the playlists in that playing group is ensured; and when it is judged that the first broadcast control action number is smaller than the current broadcast control action number, the list synchronization message is abandoned, thus avoiding that the playlist updating operation of the network abnormal client leads to the jumping back of the playlist information of the network normal client, and ensuring the continuity of the playing information.

Embodiment 5

Figure 5:
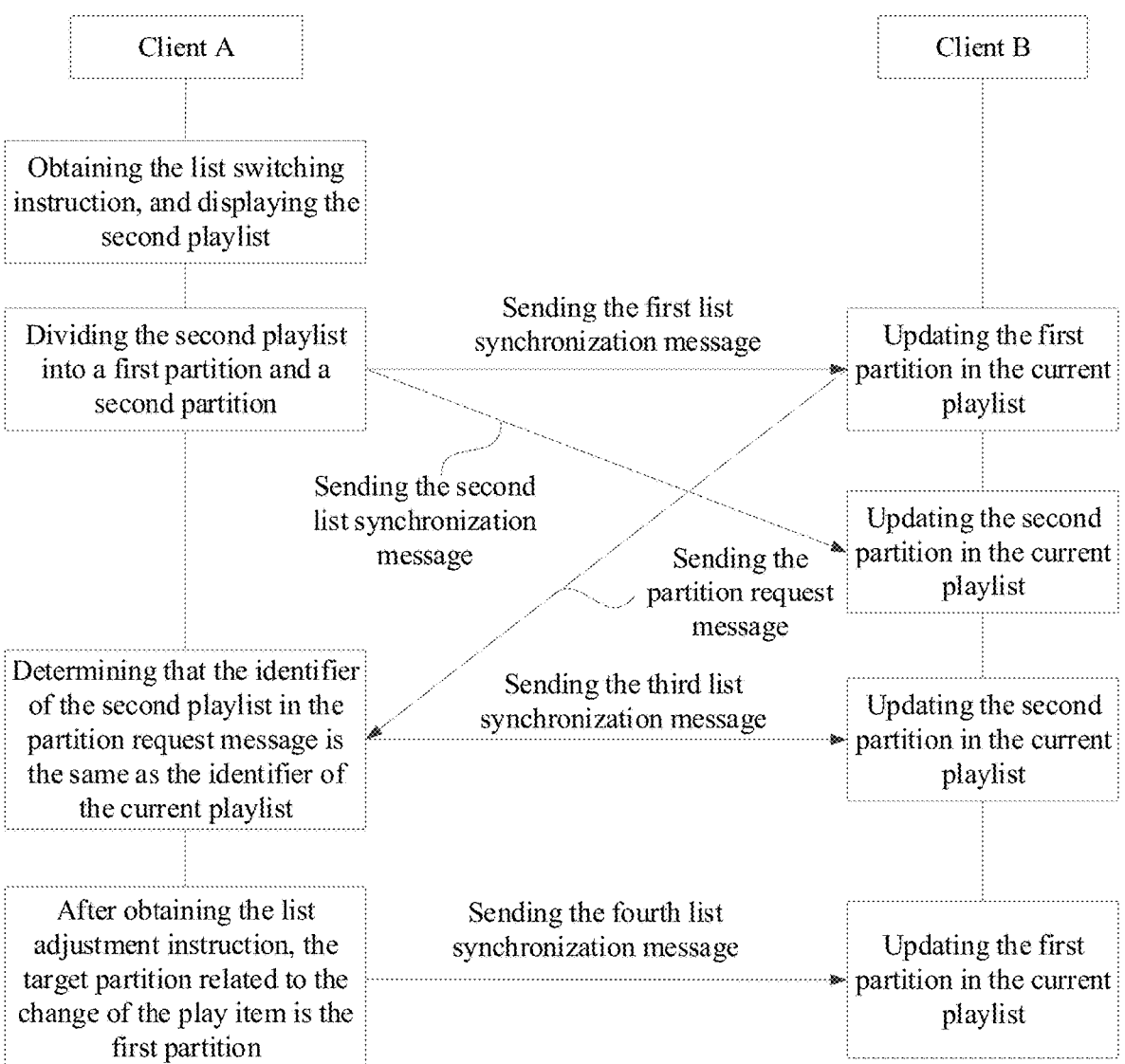
FIG. 5 is a flowchart of yet another embodiment of a synchronization method of playing information of the present disclosure.

FIG. 5 is a flowchart of a synchronization method of playing information provided by Embodiment 5 of the present disclosure. This embodiment is refined on the basis of the above embodiments. In the embodiment of the present disclosure, the playing group includes a client A and a client B, and the client A successively obtains a list switching instruction and a list adjustment instruction, including:

After obtaining the list switching instruction, the client A displays the corresponding second playlist and divides the second playlist into two partitions, namely a first partition and a second partition; the client A sends the identifier of the second playlist, the partition information of the second playlist (i.e., a first partition identifier, a second partition identifier, a first partition summary, and a second partition summary), and play item information of the first partition to the client B through a first list synchronization message.

The client A also sends the identifier of the second playlist, the partition information of the second playlist (i.e., the first partition identifier, the second partition identifier, the first partition summary, and the second partition summary), and play item information of the second partition to the client B through a second list synchronization message.

After receiving the first list synchronization message, the client B updates a first partition in the current playlist according to the play item information of the first partition; the client B determines that the identifier of the second playlist is the same as the identifier of the current playlist, and then obtains the partition identifier of the difference partition (i.e., the second partition) according to the partition summary of the second playlist and the partition summary of the current playlist. According to the identifier of the second playlist and the partition identifier of the second partition, the client B sends a partition request message to the client A to request to obtain the play item information of the second partition. After receiving the second list synchronization message, the client B updates a second partition in the current playlist according to the play item information of the second partition.

The client A receives the partition request message; the client A determines that the identifier of the second playlist in the partition request message is the same as the identifier of the current playlist, and sends the play item information of the second partition to the client B through a third list synchronization message according to the partition identifier of the second partition; and the client B updates the second partition in the current playlist again according to the play item information of the second partition.

The second list synchronization message is the play item information of the subsequent partition (i.e., the second partition) sent by the client A after obtaining the list switching instruction and in order to ensure that a complete playlist is sent; the third list synchronization message is the play item information of the second partition sent by the client A based on the acquisition request of the subsequent partition (i.e., the second partition) sent by the client B. In essence, the second list synchronization message and the third list synchronization message comprise the same play item information. For the client B, the third list synchronization message can be regarded as a redundant message. However, due to the existence of the redundant message, when the client A continuously sends the complete playlist through a plurality of list synchronization messages, the client B cannot completely obtain the above-mentioned plurality of list synchronization messages due to network abnormality and other reasons, which causes the list synchronization messages to be lost, the playlist can also be updated through the above-mentioned redundant message, which ensures that the playlists displayed by all clients in the playing group are consistent.

After the client A obtains the list adjustment instruction, the play items of the second playlist are changed, but the identifier of the second playlist remains unchanged; the client obtains the target partition related to the change of the play item as the first partition; the client A sends the identifier of the second playlist, the partition information of the second playlist, and play item information of the first partition to the client B through a fourth list synchronization message; the client B updates the first partition in the current playlist according to the play item information of the first partition.

According to the technical scheme of the embodiments of the present disclosure, in response to obtaining the list switching instruction, the client actively sends a plurality of list synchronization messages and responds to the partition request messages sent by other clients, so as to ensure that other clients in the playing group can obtain the playlist of the current client in time, thereby avoiding the playlists of all clients in the playing group from being inconsistent when the list synchronization message is lost; and meanwhile, in response to obtaining the list adjustment instruction, only the play item information of the difference partition is sent to other clients, thereby reducing the amount of transmission data between clients and saving the communication resources occupied by the date transmission.

Embodiment 6

Figure 6:
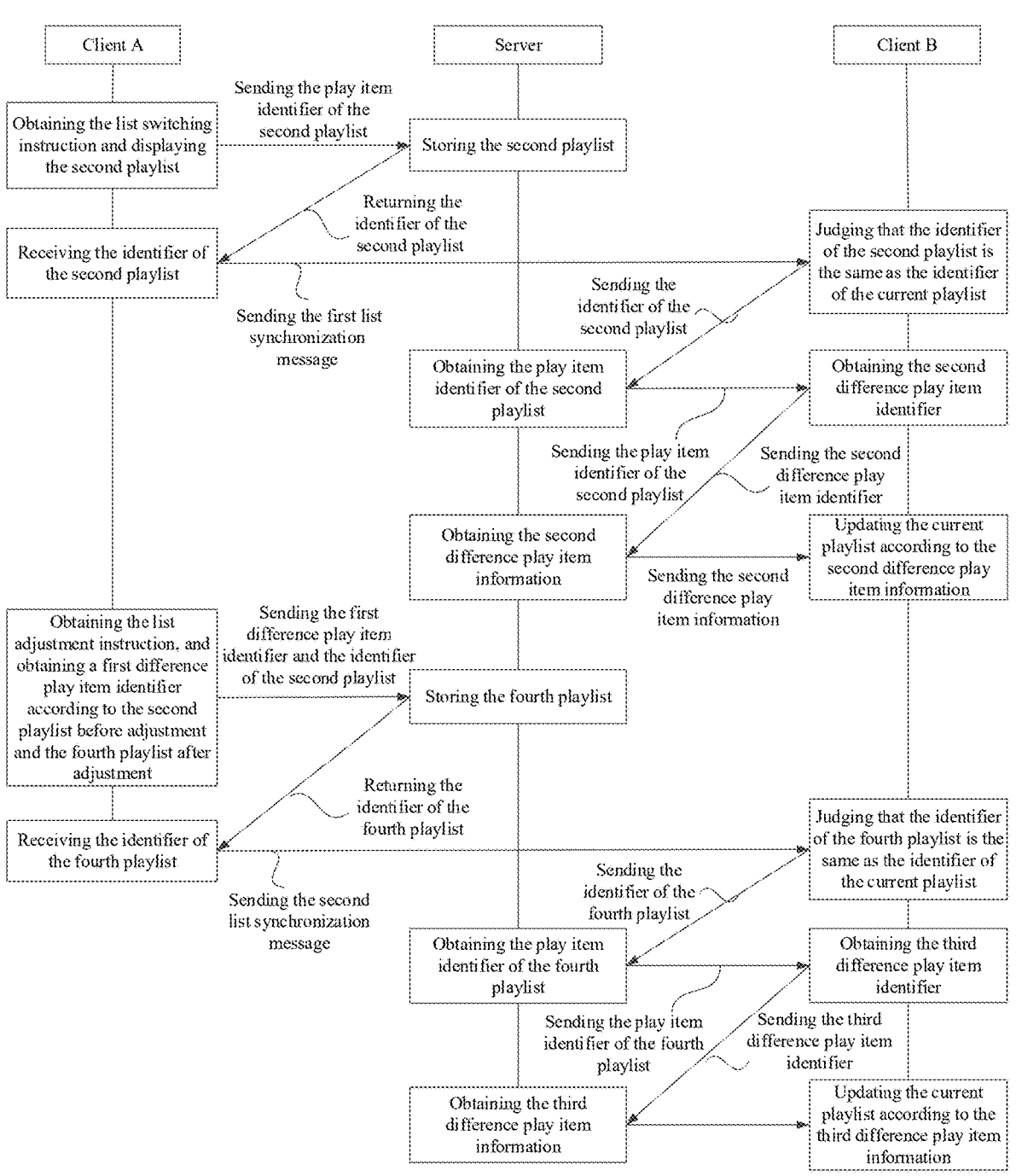
FIG. 6 is a flowchart of yet another embodiment of a synchronization method of playing information of the present disclosure.

FIG. 6 is a flowchart of a playlist synchronization method provided by Embodiment 6 of the present disclosure. This embodiment is refined on the basis of the above embodiments. In the embodiment of the present disclosure, the playing group includes a client A and a client B, and the client A successively obtains a list switching instruction and a list adjustment instruction, including:

The client A obtains the list switching instruction and displays the corresponding second playlist; the client A sends the play item identifier of the second playlist to the server; the server stores the second playlist; the server returns the identifier of the second playlist; the client A receives the identifier of the second playlist; the client A sends a first list synchronization message to the client B in the playing group; the client B receives the first list synchronization message sent by the client A, and judges that the identifier of the second playlist in the first list synchronization message is the same as the identifier of the current playlist; the client B sends the identifier of the second playlist to the server; the server obtains the play item identifier of the second playlist according to the identifier of the second playlist; the server sends the play item identifier of the second playlist to the client B; the client B obtains a second difference play item identifier according to the play item identifier of the second playlist and the play item identifier of the current playlist; the server acquires the second difference play item information according to the second difference play item identifier; the server sends the second difference play item information to the client B; and the client B updates the current playlist according to the second difference play item information.

The client A obtains the list adjustment instruction, and obtains a first difference play item identifier according to the second playlist before adjustment and the fourth playlist after adjustment; the client A sends the first difference play item identifier and the identifier of the second playlist to the server; the server stores the fourth playlist according to the first difference play item identifier and the identifier of the second playlist; the server returns the identifier of the fourth playlist; the client A receives the identifier of the fourth playlist; the client A sends the second list synchronization message to the client B in the playing group; the client B receives the second list synchronization message sent by the client A, and judges that the identifier of the fourth playlist in the second list synchronization message is the same as the identifier of the current playlist; the client B sends the identifier of the fourth playlist to the server; the server obtains the play item identifier of the fourth playlist according to the identifier of the fourth playlist; the server sends the play item identifier of the fourth playlist to the client B; the client B obtains a third difference play item identifier according to the play item identifier of the fourth playlist and the play item identifier of the current playlist; the server acquires the third difference play item information according to the third difference play item identifier; the server sends the third difference play item information to the client B; and the client B updates the current playlist according to the third difference play item information.

According to the technical scheme of the embodiments of the present disclosure, in response to obtaining the list switching instruction or the list adjustment instruction, the client obtains an updated playlist identifier through the server and sends it to other clients in the playing group, and the other clients obtain play item information, stored in the server, of the playlist corresponding to the updated playlist identifier according to the above updated playlist identifier, so as to update the current playlist, thus ensuring that the playlists of the various clients in the playing group are updated synchronously. Compared with the playlist transmission between clients, the data transmission rate between the client and the server is faster, which achieves the timely update of playlists and ensures the real-time performance of shared broadcast control.

Embodiment 7

Figure 7:
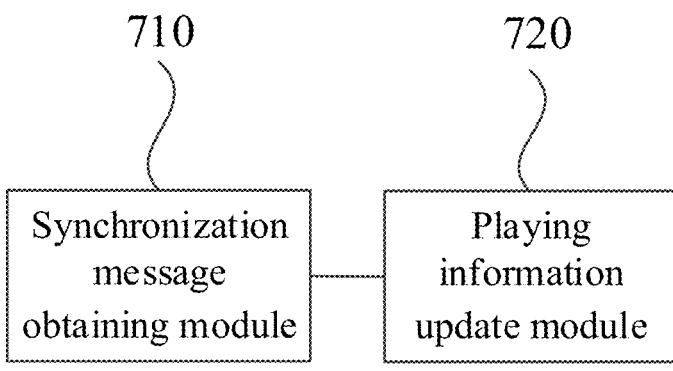
FIG. 7 is a structural block diagram of a synchronization apparatus of playing information in embodiment 7 of the present disclosure.

FIG. 7 is a structural block diagram of a synchronization apparatus of playing information provided by Embodiment 7 of the present disclosure, and the synchronization apparatus includes a synchronization message obtaining module 710 and a playing information update module 720.

The synchronization message obtaining module 710 is configured to, in response to obtaining a playing synchronization message sent by any one second client of at least one second client in a playing group, update current playing information according to the playing synchronization message.

The playing information update module 720 is configured to display matched target playing information in response to obtaining a user operation instruction, and send the target playing information to the at least one second client in the playing group through the playing synchronization message, so that the at least one second client updates respective playing information according to the target playing information.

According to the technical scheme of the embodiments of the present disclosure, when the first client obtains the playing synchronization message sent by the second client in the playing group, the first client updates the current playing information according to the playing synchronization message, and when the first client obtains the user operation instruction, the first client sends the current playing information to other clients in the playing group through the playing synchronization message, so that the other clients can update their respective playing information, which ensures the consistency of the playing information of clients in the playing group, and at the same time, all users in the playing group have the same control permission, thus improving the sharing participation of users.

Optionally, based on the above technical scheme, the synchronization message obtaining module 710 includes:
a list identifier judgement unit, configured to, in response to obtaining a list synchronization message sent by any one of the at least one second client in the playing group, judge whether an identifier of a first playlist in the list synchronization message is identical with an identifier of a current playlist;
a playlist update unit, configured to, in response to the identifier of the first playlist being the same as the identifier of the current playlist, compare a partition summary of the first playlist in the list synchronization message with a partition summary of the current playlist to obtain a difference partition where there is a difference in play items, and obtain play item information of the difference partition through a matched second client to update the current playlist.

Optionally, based on the above technical scheme, the playing information update module 720 includes:
a first switch instruction obtaining unit, configured to display a corresponding second playlist in response to obtaining a list switching instruction, and obtain an identifier of the second playlist and partition information of the second playlist, the partition information comprising a partition identifier and a partition summary;
a first synchronization message sending unit, configured to send the list synchronization message to the at least one second client in the playing group, so that the at least one second client updates respective playlists according to the identifier of the second playlist and the partition information of the second playlist.

Optionally, based on the above technical scheme, the playing information update module 720 further comprises:
a first adjustment instruction obtaining unit, configured to display a corresponding third playlist in response to obtaining a list adjustment instruction, and obtain partition information of a target partition associated with play item adjustment;
a second synchronization message sending unit, configured to send the list synchronization message to the at least one second client in the playing group, so that the at least one second client updates respective playlists according to an identifier of the third playlist and the partition information of the target partition.

Optionally, on the basis of the above technical scheme, the list synchronization message further includes play item information of at least one partition.

Optionally, based on the above technical scheme, the playing information update module 720 includes:

a partition update execution unit, configured to update a corresponding partition in the current playlist according to the play item information of the at least one partition in the list synchronization message;

a partition identifier execution unit, configured to, in response to the identifier of the first playlist being identical with the identifier of the current playlist, obtain identifiers of other partitions than the at least one partition according to the partition summary of the first playlist in the list synchronization message and the partition summary of the current playlist, and send a slice request message to the matched second client to obtain play item information corresponding to the identifiers of the other partitions.

Optionally, based on the above technical scheme, the playing information update module 720 further comprises:

a slice request obtaining unit, configured to, in response to obtaining a slice request message sent by any one second client of the at least one second client in the playing group, judge whether an identifier of a fourth playlist in the slice request message is identical with the identifier of the current playlist;

a play item sending unit, configured to, in response to the identifier of the fourth playlist being the same as the identifier of the current playlist, send play item information to the matched second client according to a partition identifier in the slice request message; and a slice request abandonment unit, configured to abandon the slice request message if the identifier of the fourth playlist is different from the identifier of the current playlist.

Optionally, based on the above technical scheme, the playing information update module 720 further comprises:

a play item synchronization unit, configured to send play item information of the second playlist to the at least one second client through at least one list synchronization message, so that the at least one second client updates the respective playlists according to the play item information of the second playlist.

Optionally, based on the above technical scheme, the playing information update module 720 further comprises:

a list identifier judgement unit, configured to, in response to obtaining a list synchronization message sent by any one of the at least one second client in the playing group, judge whether an identifier of a first playlist in the list synchronization message is identical with an identifier of a current playlist;

a playlist obtaining unit, configured to, in response to the identifier of the first playlist being different from the identifier of the current playlist, obtain play item information of the first playlist stored in a server according to the identifier of the first playlist, so as to update the current playlist.

Optionally, based on the above technical scheme, the playing information update module 720 includes:

a second switch instruction obtaining unit, configured to, in response to obtaining a list switching instruction, display a corresponding fifth playlist, and send a play item identifier of the fifth playlist to a server, so that the server stores the fifth playlist;

a third synchronization message sending unit, configured to obtain an identifier of the fifth playlist sent by the server, and send the list synchronization message to the at least one second client, so that the at least one second client updates respective playlists according to the identifier of the fifth playlist.

Optionally, based on the above technical scheme, the playing information update module 720 includes:

a second adjustment instruction obtaining unit, configured to, in response to obtaining a list adjustment instruction, obtain a first difference play item identifier according to a sixth playlist before adjustment and a seventh playlist after adjustment;

a play item identifier sending unit, configured to send the first difference play item identifier and an identifier of the sixth playlist to a server, so that the server stores the seventh playlist according to the first difference play item identifier and the identifier of the sixth playlist; and a fourth synchronization message sending unit, configured to obtain an identifier of the seventh playlist sent by the server, and send the list synchronization message to the at least one second client, so that the at least one second client updates respective playlists according to the identifier of the seventh playlist.

Optionally, on the basis of the above technical scheme, the second adjustment instruction obtaining unit is configured to obtain, according to the sixth playlist before adjustment and the seventh playlist after adjustment, a first difference file comprising the first difference play item identifier through a difference comparison tool.

A play item identifier sending unit is configured to send the first difference file and the identifier of the sixth playlist to the server, so that the server stores the seventh playlist according to the first difference file and the identifier of the sixth playlist.

Optionally, on the basis of the above technical scheme, the second adjustment instruction obtaining unit is further configured to compare the sixth playlist before adjustment with the seventh playlist after adjustment by the difference comparison tool to obtain the first difference file comprising the first difference play item identifier.

Optionally, on the basis of the above technical scheme, the playlist obtaining unit is configured to obtain, according to the identifier of the first playlist, a play item identifier of the first playlist through the server, and obtain a second difference play item identifier according to the play item identifier of the first playlist and a play item identifier of the current playlist; and obtain, according to the second difference play item identifier, second difference play item information stored in the server to update the current playlist.

Optionally, based on the above technical scheme, the playing information update module 720 further comprises:

a broadcast control action number judgement unit, configured to judge whether a first broadcast control action number in the list synchronization message is greater than a current broadcast control action number; the first broadcast control action number comprising a broadcast control count value and an in-group serial number of the second client in the playing group;

a list identifier judgement unit, configured to update, in response to the first broadcast control action number being greater than the current broadcast control action number, the current broadcast control action number to the first broadcast control action number, and judge whether the identifier of the first playlist in the list synchronization message is identical with the identifier of the current playlist;

a synchronization message abandonment unit, configured to abandon the list synchronization message in response to the first broadcast control action number being smaller than the current broadcast control action number.

Optionally, on the basis of the above technical scheme, the synchronization apparatus of playing information further comprises:

a voice call instruction obtaining module, configured to set, in response to obtaining a voice call instruction, a voice call button in a current display page to be in a lit state, and send a first voice message that is obtained to the at least one second client, so that the at least one second client broadcasts the first voice message;

a broadcast dynamic effect sending module, configured to play, in response to obtaining a second voice message sent by any one of the at least one second client in the playing group, the second voice message, and display a broadcast dynamic effect through avatar information of the matched second client in the current display page;

a business operation identifier obtaining module, configured to update, in response to obtaining a business operation identifier sent by any one of the at least one second client in the playing group, a matching business icon in the current display page according to the business operation identifier, the business operation identifier comprising play item like and play item favorite;

a playing record display module, configured to display, in response to obtaining a playing group end instruction sent by any one of the at least one second client in the playing group, a playing record of the playing group.

The above apparatus can execute the synchronization method of playing information provided by any embodiment of the present disclosure, and has corresponding function modules for executing the method. For technical details not described in detail in this embodiment, reference may be made to the method provided by any embodiment of the present disclosure.

Embodiment 8

Figure 8:
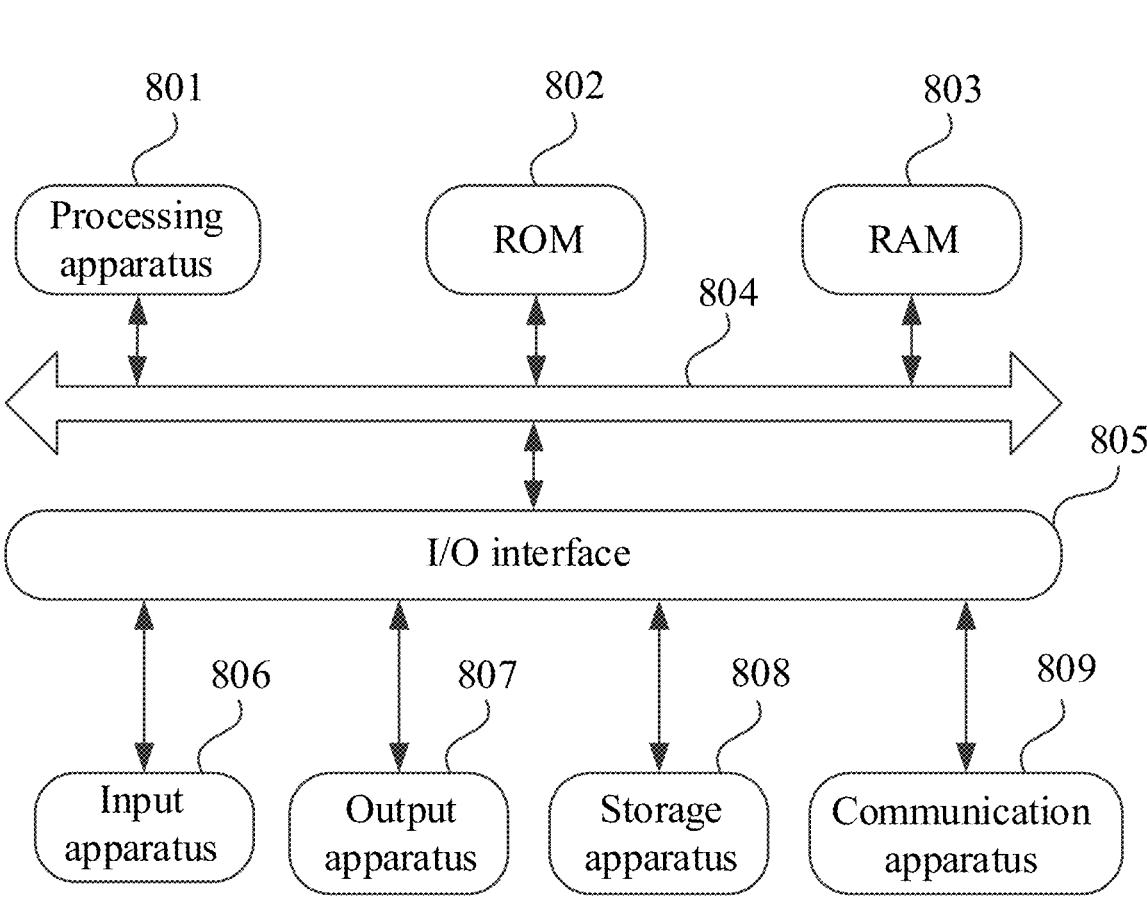
FIG. 8 is a structural block diagram of a terminal device in embodiment 8 of the present disclosure.

FIG. 8 shows a schematic structural diagram of a terminal device 800 suitable for implementing the embodiments of the present disclosure. The terminal device in the embodiments of the present disclosure may include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital television (TV), a desktop computer, or the like. The terminal device shown in FIG. 8 is only an example, and should not bring any limitation to the functions and application scope of the embodiments of the present disclosure.

As shown in FIG. 8, the terminal device 800 may include a processing apparatus (for example, a central processing unit, a graphics processing unit, etc.) 801, which may perform various appropriate actions and processes according to programs stored in a read-only memory (ROM) 802 or programs loaded from a storage apparatus 808 into a random-access memory (RAM) 803. In the RAM 803, various programs and data required for operations of the terminal device 800 are also stored. The processing apparatus 801, the ROM 802, and the RAM 803 are connected to each other through a bus 804. An input/output (I/O) interface 805 is also connected to the bus 804.

Usually, the following apparatuses can be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage apparatus 808 including, for example, a magnetic tape, a hard disk, or the like; and a communication apparatus 809. The communication apparatus 809 may allow the terminal device 800 to be in wireless or wired communication with other devices to exchange data. While FIG. 8 illustrates the terminal device 800 having various apparatuses, it should be understood that not all of the illustrated apparatuses are required to be implemented or included. More or fewer apparatuses may be implemented or provided alternatively.

In particular, according to the embodiments of the present disclosure, processes described above with reference to the flowchart may be implemented as a computer software program. For example, an embodiment of the present disclosure includes a computer program product, which includes a computer program carried on a non-transitory computer-readable medium, and the computer program includes program codes for performing the method shown in the flowchart. In such an embodiment, the computer program may be downloaded and installed from a network through the communication apparatus 809, or installed from the storage apparatus 808, or installed from the ROM 802. When the computer program is executed by the processing apparatus 801, the above functions defined in the method of the embodiment of the present disclosure are performed.

It should be noted that the above-mentioned computer-readable medium in the present disclosure may be a computer-readable signal medium or a computer-readable storage medium or any combination of the above two mediums. For example, the computer-readable storage medium may be, but not limited to, an electric, magnetic, optical, electromagnetic, infrared, or semi-conductive system, apparatus, or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus, or device. In the present disclosure, the computer-readable signal medium may include a data signal that propagates in a baseband or as a part of a carrier wave and carries computer-readable program codes. The data signal propagating in such a manner may take various forms, including but not limited to an electromagnetic signal, an optical signal, or any appropriate combination thereof. The computer-readable signal medium may also be any other computer-readable medium than the computer-readable storage medium. The computer-readable signal medium may send, propagate, or transmit a program used by or in combination with an instruction execution system, apparatus, or device. The program code contained on the computer-readable medium may be transmitted by using any suitable medium, including but not limited to an electric wire, a fiber-optic cable, radio frequency (RF), and the like, or any appropriate combination of them.

In some implementations, a client and a server may communicate using any currently known or future developed network protocol, such as HTTP (HyperText Transfer Protocol), and may be interconnected with digital data communication (for example, the communications network) in any form or medium. Examples of the communication network include a local area network ("LAN"), a wide area network ("WAN"), the Internet (for example, the Internet), and an end-to-end network (for example, an ad hoc end-to-end network), as well as any currently known or future developed network.

The above-mentioned computer-readable medium may be included in the terminal device described above, or may exist alone without being assembled into the terminal device.

The above-mentioned computer-readable medium carries at least one program, when the at least one program is executed by the terminal device, the terminal device is caused to: in response to obtaining a playing synchronization message sent by any one of at least one second client in a playing group, update current playing information according to the playing synchronization message; display matched target playing information in response to obtaining a user operation instruction, and send the target playing information to the at least one second client in the playing group through the playing synchronization message, so that the at least one second client updates respective playing information according to the target playing information.

The computer program codes for performing the operations of the present disclosure can be written in one or more programming languages or a combination thereof. The above programming languages include but not limited to object-oriented programming languages such as Java, Smalltalk, C++, and also include conventional procedural programming languages such as the "C" language or similar programming languages. The program code can be executed entirely on the user's computer, partly on the user's computer, as a stand-alone software package, partly on the user's computer and partly on a remote computer, or entirely on the remote computer or terminal device. In the scenario related to the remote computer, the remote computer may be connected to the user's computer through any type of network, including a local area network (LAN) or a wide area network (WAN), or may be connected to an external computer (for example, through the Internet using an Internet service provider).

The flowcharts and block diagrams in the accompanying drawings illustrate system architectures, functions, and operations that may be implemented by the system, the method, and the computer program product according to the various embodiments of the present disclosure. In this regard, each block in the flowcharts or block diagrams may represent a module, a program segment, or a part of codes, and the module, the program segment, or the part of codes includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the block diagrams and/or flowcharts and combinations of the blocks in the block diagrams and/or flowcharts may be implemented by a dedicated hardware-based system for executing specified functions or operations, or may be implemented by a combination of a dedicated hardware and computer instructions.

The modules described and involved in the embodiments of the present disclosure may be implemented by software, or may be implemented by hardware. In some cases, the name of a module does not constitute a limitation on the module itself, for example, the synchronization message obtaining module can be described as "in response to obtaining a playing synchronization message sent by any one of at least one second client in a playing group, updating current playing information according to the playing synchronization message". The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard parts (ASSP), a system on chip (SOC), a complex programmable logic device (CPLD), and the like.

In the context of the present disclosure, a machine readable medium may be a tangible medium that may include or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semi-conductive system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of them.

In addition, although various operations have been described in a particular order, it shall not be construed as requiring that such operations are performed in the shown particular order or in a sequential order. Under certain circumstances, multitasking and parallel processing may be advantageous. Similarly, although some specific implementation details are included in the above discussions, these shall not be construed as limitations to the scope of the present disclosure. Some features described in the context of a separate embodiment may also be implemented in combination in a single embodiment. Conversely, various features described in the context of a single embodiment may also be implemented in various embodiments individually or in a plurality of embodiments in any appropriate sub-combination.

What is claimed is:

1. A synchronization method of playing information, applied to a first client and comprising:
in response to obtaining a playing synchronization message sent by any one second client of at least one second client in a playing group, updating current playing information according to the playing synchronization message;

displaying target playing information in response to obtaining a user operation instruction, and sending the target playing information to the at least one second client in the playing group through the playing synchronization message, so that the at least one second client updates respective playing information according to the target playing information, wherein the in response to obtaining the playing synchronization message sent by any one second client of at least one second client in the playing group, updating current playing information according to the playing synchronization message comprises:

in response to obtaining a list synchronization message sent by the any one second client of the at least one second client in the playing group, judging whether an identifier of a first playlist in the list synchronization message is identical with an identifier of a current playlist;

in response to the identifier of the first playlist being identical with the identifier of the current playlist, comparing a partition summary of the first playlist in the list synchronization message with a partition summary of the current playlist to obtain a difference partition where there is a difference in play items, and obtaining play item information of the difference partition through a matched second client to update the current playlist.

2. The method according to claim 1, wherein the displaying target playing information in response to obtaining a user operation instruction, and sending the target playing information to the at least one second client in the playing group through the playing synchronization message comprises:

displaying a second playlist in response to obtaining a list switching instruction, and obtaining an identifier of the second playlist and partition information of the second playlist, wherein the partition information comprises a partition identifier and a partition summary; and sending the list synchronization message to the at least one second client in the playing group, so that the at least one second client respectively updates at least one playlist, which is in one-to-one correspondence to the at least one second client, according to the identifier of the second playlist and the partition information of the second playlist.

3. The method according to claim 1, wherein the displaying target playing information in response to obtaining a user operation instruction, and sending the target playing information to the at least one second client in the playing group through the playing synchronization message comprises:

in response to obtaining a list adjustment instruction, displaying a third playlist, and obtaining partition information of a target partition associated with play item adjustment; and sending the list synchronization message to the at least one second client in the playing group, so that the at least one second client respectively updates at least one playlist, which is in one-to-one correspondence to the at least one second client, according to an identifier of the third playlist and the partition information of the target partition.

4. The method according to claim 1, wherein the list synchronization message further comprises play item information of at least one partition;

before judging whether an identifier of a first playlist in the list synchronization message is identical with an identifier of a current playlist, the method further comprises:

updating a corresponding partition in the current playlist according to the play item information of the at least one partition in the list synchronization message;

after judging whether an identifier of a first playlist in the list synchronization message is identical with an identifier of a current playlist, the method further comprises:

in response to the identifier of the first playlist being identical with the identifier of the current playlist, obtaining identifiers of other partitions than the at least one partition according to the partition summary of the first playlist in the list synchronization message and the partition summary of the current playlist, and sending a slice request message to the matched second client to obtain play item information corresponding to the identifiers of the other partitions.

5. The method according to claim 2, further comprising:

in response to obtaining a slice request message sent by any one second client of the at least one second client in the playing group, judging whether an identifier of a fourth playlist in the slice request message is identical with the identifier of the current playlist;

in response to the identifier of the fourth playlist being identical with the identifier of the current playlist, sending play item information to the matched second client according to a partition identifier in the slice request message; and in response to the identifier of the fourth playlist being different from the identifier of the current playlist, abandoning the slice request message.

6. The method according to claim 2, after the obtaining an identifier of the second playlist and partition information of the second playlist, further comprising:

sending play item information of the second playlist to the at least one second client through at least one list synchronization message, so that the at least one second client respectively updates the at least one playlist, which is in one-to-one correspondence to the at least one second client, according to the play item information of the second playlist.

7. The method according to claim 1, wherein the in response to obtaining the playing synchronization message sent by any one second client of at least one second client in the playing group, updating current playing information according to the playing synchronization message further comprises:

in response to the identifier of the first playlist being different from the identifier of the current playlist, obtaining play item information of the first playlist stored in a server according to the identifier of the first playlist, so as to update the current playlist.

8. The method according to claim 7, wherein the displaying target playing information in response to obtaining a user operation instruction, and sending the target playing information to the at least one second client in the playing group through the playing synchronization message further comprises:

in response to obtaining a list switching instruction, displaying a fifth playlist, and sending a play item identifier of the fifth playlist to the server, so that the server stores the fifth playlist; and obtaining an identifier of the fifth playlist sent by the server, and sending the list synchronization message to the at least one second client, so that the at least one second client respectively updates at least one playlist, which is in one-to-one correspondence to the at least one second client, according to the identifier of the fifth playlist.

9. The method according to claim 7, wherein the displaying target playing information in response to obtaining a user operation instruction, and sending the target playing information to the at least one second client in the playing group through the playing synchronization message further comprises:

in response to obtaining a list adjustment instruction, obtaining a first difference play item identifier according to a sixth playlist before adjustment and a seventh playlist after adjustment;

sending the first difference play item identifier and an identifier of the sixth playlist to the server, so that the server stores the seventh playlist according to the first difference play item identifier and the identifier of the sixth playlist; and obtaining an identifier of the seventh playlist sent by the server, and sending the list synchronization message to the at least one second client, so that the at least one second client respectively updates at least one playlist, which is in one-to-one correspondence to the at least one second client, according to the identifier of the seventh playlist.

10. The method according to claim 9, wherein the obtaining a first difference play item identifier according to a sixth playlist before adjustment and a seventh playlist after adjustment comprises:

according to the sixth playlist before adjustment and the seventh playlist after adjustment, obtaining a first difference file comprising the first difference play item identifier through a difference comparison tool;

the sending the first difference play item identifier and an identifier of the sixth playlist to the server, so that the server stores the seventh playlist according to the first difference play item identifier and the identifier of the sixth playlist comprises:

sending the first difference file and the identifier of the sixth playlist to the server, so that the server stores the seventh playlist according to the first difference file and the identifier of the sixth playlist.

11. The method according to claim 10, wherein the according to the sixth playlist before adjustment and the seventh playlist after adjustment, obtaining a first difference file comprising the first difference play item identifier through a difference comparison tool comprises:

comparing the sixth playlist before adjustment with the seventh playlist after adjustment by the difference comparison tool to obtain the first difference file comprising the first difference play item identifier.

12. The method according to claim 7, wherein the obtaining play item information of the first playlist stored in a server according to the identifier of the first playlist, so as to update the current playlist comprises:

according to the identifier of the first playlist, obtaining a play item identifier of the first playlist through the server, and obtaining a second difference play item identifier according to the play item identifier of the first playlist and a play item identifier of the current playlist;

according to the second difference play item identifier, obtaining second difference play item information stored in the server to update the current playlist.

13. The method according to claim 1, before the judging whether an identifier of a first playlist in the list synchronization message is identical with an identifier of a current playlist, further comprising:

judging whether a first broadcast control action number in the list synchronization message is greater than a current broadcast control action number; wherein the first broadcast control action number comprises a broadcast control count value and an in-group serial number of the second client in the playing group;

in response to the first broadcast control action number being greater than the current broadcast control action number, updating the current broadcast control action number to the first broadcast control action number, and judging whether the identifier of the first playlist in the list synchronization message is identical with the identifier of the current playlist; and in response to the first broadcast control action number being smaller than the current broadcast control action number, abandoning the list synchronization message.

14. The method according to claim 1, further comprising at least one of following:

in response to obtaining a voice call instruction, setting a voice call button in a current display page to be in a lit state, and sending a first voice message that is obtained to the at least one second client, so that the at least one second client broadcasts the first voice message;

in response to obtaining a second voice message sent by any one of the at least one second client in the playing group, playing the second voice message, and displaying a broadcast dynamic effect through avatar information of the matched second client in the current display page;

in response to obtaining a business operation identifier sent by any one of the at least one second client in the playing group, updating a matching business icon in the current display page according to the business operation identifier, wherein the business operation identifier comprises play item like and play item favorite; and in response to obtaining a playing group end instruction sent by any one of the at least one second client in the playing group, displaying a playing record of the playing group.

15. A terminal device, comprising a memory, a processor, and a computer program stored on the memory and executable on the processor, wherein when the processor executes the computer program, the processor performs a synchronization method of playing information, wherein the synchronization method of playing information is applied to a first client and comprises:

in response to obtaining a playing synchronization message sent by any one second client of at least one second client in a playing group, updating current playing information according to the playing synchronization message;

displaying target playing information in response to obtaining a user operation instruction, and sending the target playing information to the at least one second client in the playing group through the playing synchronization message, so that the at least one second client updates respective playing information according to the target playing information, wherein the in response to obtaining the playing synchronization message sent by any one second client of at least one second client in the playing group, updating current playing information according to the playing synchronization message comprises:

in response to obtaining a list synchronization message sent by the any one second client of the at least one second client in the playing group, judging whether an identifier of a first playlist in the list synchronization message is identical with an identifier of a current playlist;

in response to the identifier of the first playlist being identical with the identifier of the current playlist, comparing a partition summary of the first playlist in the list synchronization message with a partition summary of the current playlist to obtain a difference partition where there is a difference in play items, and obtaining play item information of the difference partition through a matched second client to update the current playlist.

16. A non-transitory storage medium, comprising computer-executable instructions, wherein the computer-executable instructions, when executed by a computer processor, are used to perform a synchronization method of playing information, wherein the synchronization method of playing information is applied to a first client and comprises:

in response to obtaining a playing synchronization message sent by any one second client of at least one second client in a playing group, updating current playing information according to the playing synchronization message;

displaying target playing information in response to obtaining a user operation instruction, and sending the target playing information to the at least one second client in the playing group through the playing synchronization message, so that the at least one second client updates respective playing information according to the target playing information, wherein the in response to obtaining the playing synchronization message sent by any one second client of at least one second client in the playing group, updating current playing information according to the playing synchronization message comprises:

in response to obtaining a list synchronization message sent by the any one second client of the at least one second client in the playing group, judging whether an identifier of a first playlist in the list synchronization message is identical with an identifier of a current playlist;

in response to the identifier of the first playlist being identical with the identifier of the current playlist, comparing a partition summary of the first playlist in the list synchronization message with a partition summary of the current playlist to obtain a difference partition where there is a difference in play items, and obtaining play item information of the difference partition through a matched second client to update the current playlist.

17. The method according to claim 2, wherein the displaying target playing information in response to obtaining a user operation instruction, and sending the target playing information to the at least one second client in the playing group through the playing synchronization message comprises:

in response to obtaining a list adjustment instruction, displaying a third playlist, and obtaining partition information of a target partition associated with play item adjustment; and sending the list synchronization message to the at least one second client in the playing group, so that the at least one second client respectively updates the at least one playlist, which is in one-to-one correspondence to the at least one second client, according to an identifier of the third playlist and the partition information of the target partition.

18. The method according to claim 8, wherein the displaying target playing information in response to obtaining a user operation instruction, and sending the target playing information to the at least one second client in the playing group through the playing synchronization message further comprises:

in response to obtaining a list adjustment instruction, obtaining a first difference play item identifier according to a sixth playlist before adjustment and a seventh playlist after adjustment;

sending the first difference play item identifier and an identifier of the sixth playlist to the server, so that the server stores the seventh playlist according to the first difference play item identifier and the identifier of the sixth playlist; and obtaining an identifier of the seventh playlist sent by the server, and sending the list synchronization message to the at least one second client, so that the at least one second client respectively updates the at least one playlist, which is in one-to-one correspondence to the at least one second client, according to the identifier of the seventh playlist.

* * * * *